US012602456B1

(12) United States Patent

MacDonald et al.

(10) Patent No.: US 12,602,456 B1

(45) Date of Patent: Apr. 14, 2026

(54) COMPUTING SYSTEMS FOR GENERATING AUTHORIZATION CREDENTIALS AND RECEIVING VERIFIED AUTHORIZATION CREDENTIALS

(71) Applicant: Avalara, Inc., Seattle, WA (US)

(72) Inventors: Nichol A. MacDonald, Chapel Hill, NC (US); Lauren Shepulski Gabbert, Durham, NC (US); Renai Bell, Portland, OR (US); Thomas Goldschmidt, Karlsdorf-Neuthard (DE)

(73) Assignee: Avalara, Inc., Seattle, WA (US)

( * ) Notice: Subject to any disclaimer, the term of this patent is extended or adjusted under 35 U.S.C. 154(b) by 281 days.

(21) Appl. No.: 18/170,461

(22) Filed: Feb. 16, 2023

(51) Int. Cl.
*G06F 21/31* (2013.01)
*G06F 21/45* (2013.01)

(52) U.S. Cl.
CPC .............. *G06F 21/31* (2013.01); *G06F 21/45* (2013.01)

(58) Field of Classification Search
CPC ................................. G06F 21/31; G06F 21/45
See application file for complete search history.

(56) References Cited

U.S. PATENT DOCUMENTS

| | | | |
|---|---|---|---|
| 7,783,536 B2 | 8/2010 | William et al. | |
| 7,933,803 B1 | 4/2011 | Nadler et al. | |
| 8,620,578 B1 | 12/2013 | Brown et al. | |

| | | | |
|---|---|---|---|
| 8,725,407 B2 | 5/2014 | Hurley et al. | |
| 9,760,915 B2 | 9/2017 | Pavlou et al. | |
| 10,332,216 B2 | 6/2019 | Barsade et al. | |
| 10,445,818 B1 | 10/2019 | Chowdhary | |
| 10,769,611 B2 | 9/2020 | Mcneel | |
| 10,872,100 B1 | 12/2020 | Shefferman et al. | |
| 11,176,620 B1 | 11/2021 | Lubczynski et al. | |
| 11,238,542 B1 | 2/2022 | Wixted et al. | |
| 11,475,430 B2 | 10/2022 | Burton et al. | |
| 11,914,698 B2 * | 2/2024 | Bravo ................... | G06F 21/604 |
| 2002/0138765 A1 | 9/2002 | Fishman et al. | |
| 2007/0136158 A1 | 6/2007 | Rawlings et al. | |
| 2007/0136159 A1 | 6/2007 | Rawlings et al. | |
| 2009/0187500 A1 | 7/2009 | Wilson et al. | |
| 2013/0013471 A1 | 1/2013 | Fishman | |
| 2014/0172656 A1 | 6/2014 | Shaw | |
| 2014/0351105 A1 | 11/2014 | Hamm | |
| 2015/0228039 A1 * | 8/2015 | Mahgoub ............... | G06Q 10/00 705/311 |
| 2016/0042466 A1 | 2/2016 | Herndon et al. | |
| 2016/0140668 A1 | 5/2016 | Maguire et al. | |

(Continued)

*Primary Examiner* — James R Turchen

(74) *Attorney, Agent, or Firm* — Stoel Rives LLP

(57) ABSTRACT

Examples of computing systems described herein may identify one or more domains associated with a request of a user to engage services of the computing system. The computing system may access rules for authorization credentials for that domain, including attributes for use in the authorization credentials. The computing system may identify values for the attributes and generate an authorization credential. The computing system may provide the authorization credential to the user for verification. The user may augment the authorization credential to create a verified authorization credential. The verified authorization credential may be provided to another entity to allow the computing system or entity associated with the computing system to communicate with the entity on behalf of the user.

14 Claims, 10 Drawing Sheets

(56)          References Cited

U.S. PATENT DOCUMENTS

| 2016/0283737 | A1* | 9/2016 | Soman | ................ | G06F 21/6245 |
| 2016/0371683 | A1* | 12/2016 | Maus | ................ | G06Q 20/3226 |
| 2017/0308695 | A1* | 10/2017 | Adams | .................... | H04L 63/06 |
| 2018/0183802 | A1* | 6/2018 | Choyi | ................ | H04L 63/0884 |
| 2018/0367528 | A1* | 12/2018 | Schwarz | ............ | H04L 63/0807 |
| 2019/0182257 | A1* | 6/2019 | Lee | ................ | G06Q 10/06315 |
| 2020/0076601 | A1* | 3/2020 | Tabrizi | ................ | H04L 9/0637 |
| 2020/0076819 | A1* | 3/2020 | Spurlock | ................ | G06F 21/10 |
| 2020/0327220 | A1* | 10/2020 | Daetz | .................... | G06F 21/31 |
| 2021/0158456 | A1 | 5/2021 | Morgan et al. | | |
| 2022/0224535 | A1* | 7/2022 | Coffing | ................ | H04L 63/205 |
| 2022/0245637 | A1* | 8/2022 | Gnanasambandam | ..................... | |
| | | | | | G06Q 30/04 |
| 2023/0069098 | A1* | 3/2023 | Berry | ................ | G06Q 20/3827 |

* cited by examiner

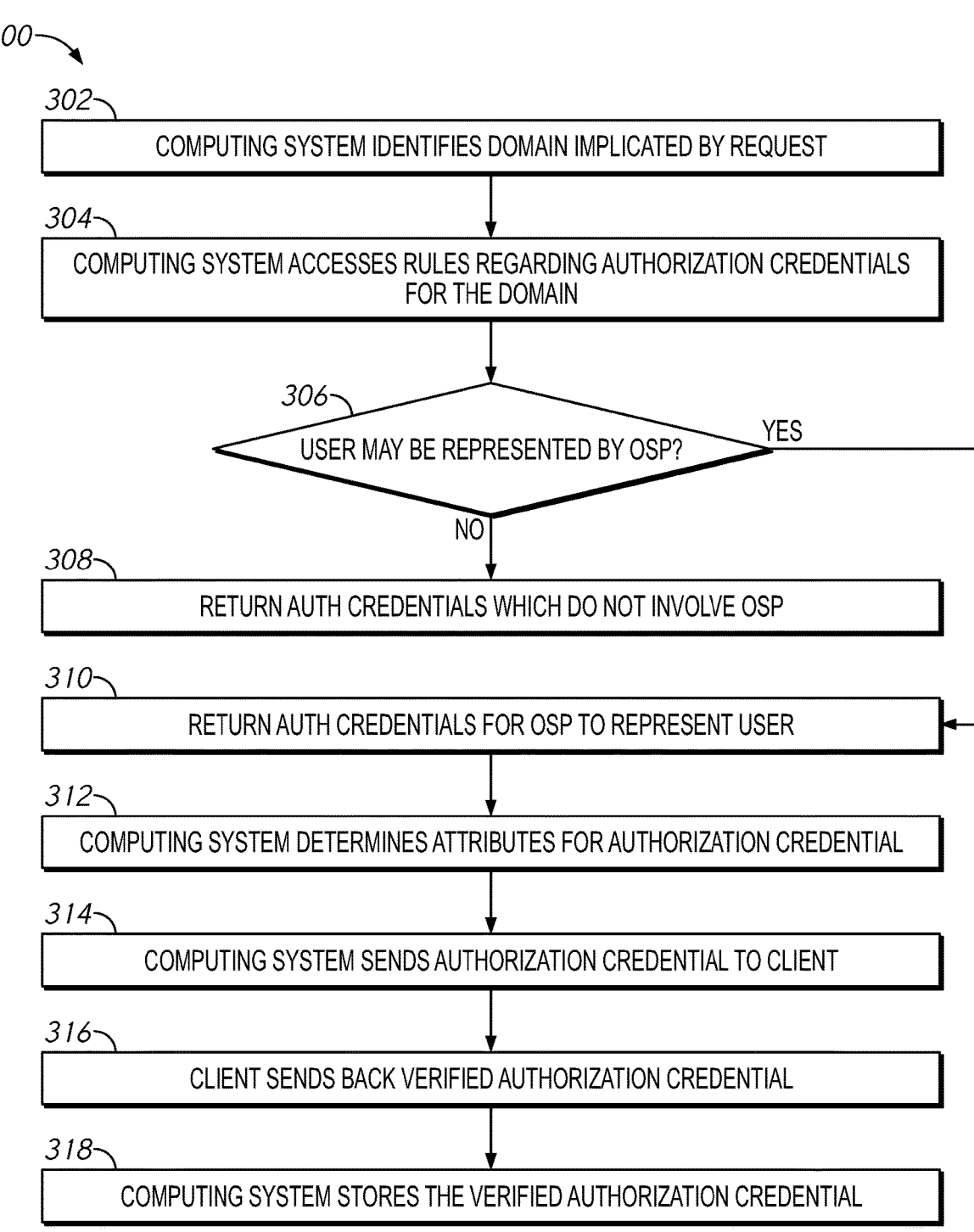

300

302 — COMPUTING SYSTEM IDENTIFIES DOMAIN IMPLICATED BY REQUEST

304 — COMPUTING SYSTEM ACCESSES RULES REGARDING AUTHORIZATION CREDENTIALS FOR THE DOMAIN

306 — USER MAY BE REPRESENTED BY OSP?

YES

NO

308 — RETURN AUTH CREDENTIALS WHICH DO NOT INVOLVE OSP

310 — RETURN AUTH CREDENTIALS FOR OSP TO REPRESENT USER

312 — COMPUTING SYSTEM DETERMINES ATTRIBUTES FOR AUTHORIZATION CREDENTIAL

314 — COMPUTING SYSTEM SENDS AUTHORIZATION CREDENTIAL TO CLIENT

316 — CLIENT SENDS BACK VERIFIED AUTHORIZATION CREDENTIAL

318 — COMPUTING SYSTEM STORES THE VERIFIED AUTHORIZATION CREDENTIAL

FIG. 3

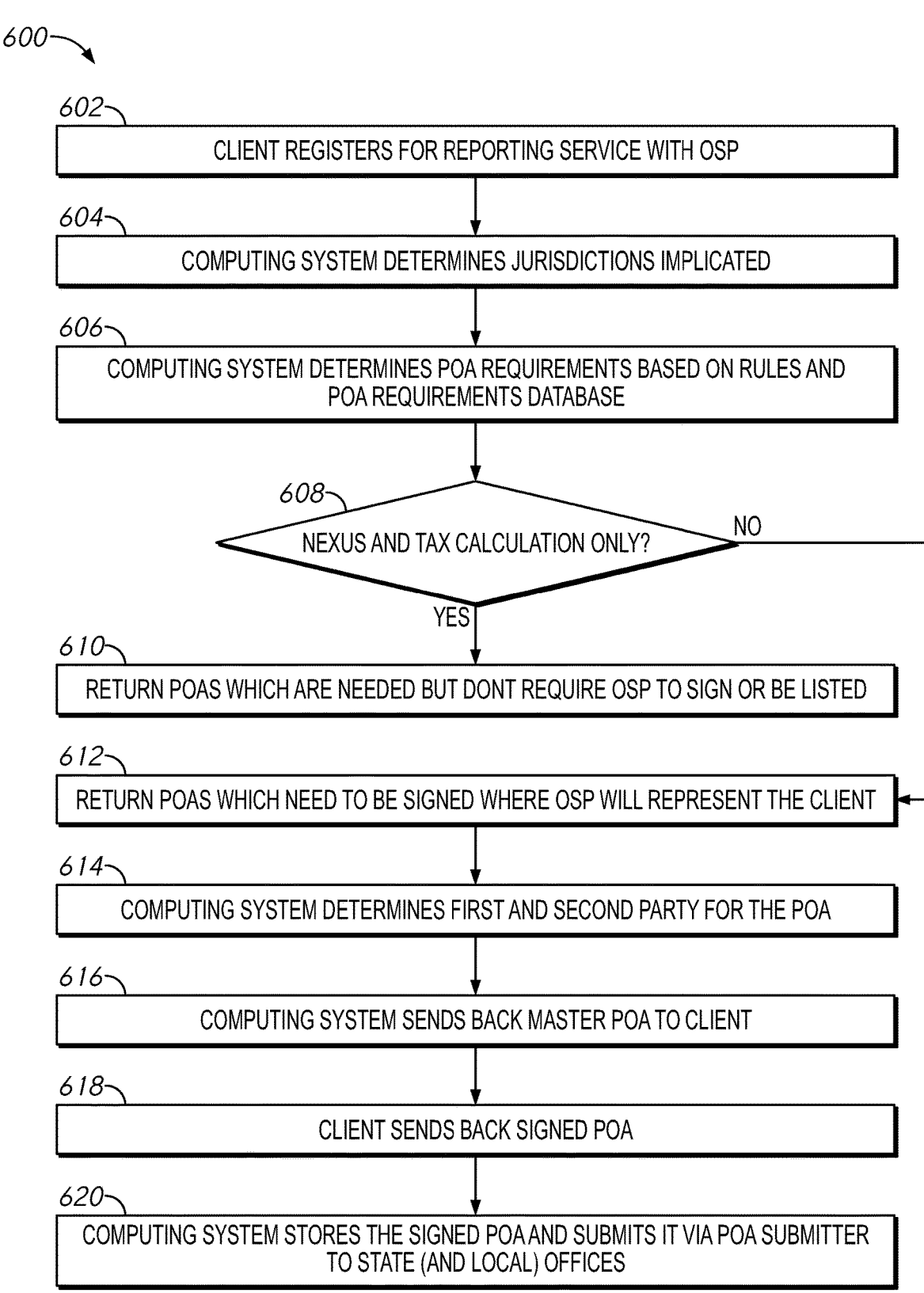

600

602 — CLIENT REGISTERS FOR REPORTING SERVICE WITH OSP

604 — COMPUTING SYSTEM DETERMINES JURISDICTIONS IMPLICATED

606 — COMPUTING SYSTEM DETERMINES POA REQUIREMENTS BASED ON RULES AND POA REQUIREMENTS DATABASE

608 — NEXUS AND TAX CALCULATION ONLY?

NO

YES

610 — RETURN POAS WHICH ARE NEEDED BUT DONT REQUIRE OSP TO SIGN OR BE LISTED

612 — RETURN POAS WHICH NEED TO BE SIGNED WHERE OSP WILL REPRESENT THE CLIENT

614 — COMPUTING SYSTEM DETERMINES FIRST AND SECOND PARTY FOR THE POA

616 — COMPUTING SYSTEM SENDS BACK MASTER POA TO CLIENT

618 — CLIENT SENDS BACK SIGNED POA

620 — COMPUTING SYSTEM STORES THE SIGNED POA AND SUBMITS IT VIA POA SUBMITTER TO STATE (AND LOCAL) OFFICES

*802*
SCREEN

Dear Customer:

Thank you for choosing to give us Power of Attorney (PoA) documents. Now it is time for you to sign them for us:

Sign all these PoA documents at once

PoA document for [jurisdiction_1]: view document   sign document

PoA document for [jurisdiction_2]: view document   sign document

PoA document for [jurisdiction_3]: view document   sign document

PoA document for [jurisdiction_4]: view document   sign document

Back

FIG. 8

COMPUTING SYSTEMS FOR GENERATING AUTHORIZATION CREDENTIALS AND RECEIVING VERIFIED AUTHORIZATION CREDENTIALS

BACKGROUND

All subject matter discussed in this Background section of this document is not necessarily prior art, and may not be presumed to be prior art simply because it is presented in this Background section. Plus, any reference to any prior art in this description is not, and should not be taken as, an acknowledgement or any form of suggestion that such prior art forms parts of the common general knowledge in any art in any country. Along these lines, any recognition of problems in the prior art discussed in this Background section or associated with such subject matter should not be treated as prior art, unless expressly stated to be prior art. Rather, the discussion of any subject matter in this Background section should be treated as part of the approach taken towards the particular problem by the inventors. This approach in and of itself may also be inventive.

Increasingly, many users utilize software services provided by a number of different software service platforms. For example, enterprise resource planning ("ERP") systems help businesses collect information relating to their operations, such as production, resource management, inventory management, sales, delivery, billing, and other operations. Similarly, accounting software applications help businesses with their accounting information, such as payroll, purchase orders, accounts payable, sales invoices, accounts receivable, and so on.

However, software service platforms often cannot interact seamlessly with other platforms or computing systems, particularly if authorization to act on behalf of a user is used to determine whether a particular interaction may occur. For example, users of a particular computing platform may desire for the platform, or an entity associated with the platform, represent and act on behalf of the user to one or more other computing systems and/or entities associated with those computing systems, such as one or more government entities. It may be cumbersome and time consuming to manually obtain powers of attorney or other authorization credentials from the user necessary to act on behalf of the user.

BRIEF DESCRIPTION OF THE DRAWINGS

FIG. 3 is a flowchart of an example method arranged in accordance with examples described herein.

FIG. 6 is a flowchart of an example method arranged in accordance with examples described herein.

FIG. 8 is a sample view of a User Interface (UI) 804, shown on a screen 802 arranged in accordance with examples described herein.

DETAILED DESCRIPTION

Figure 1:
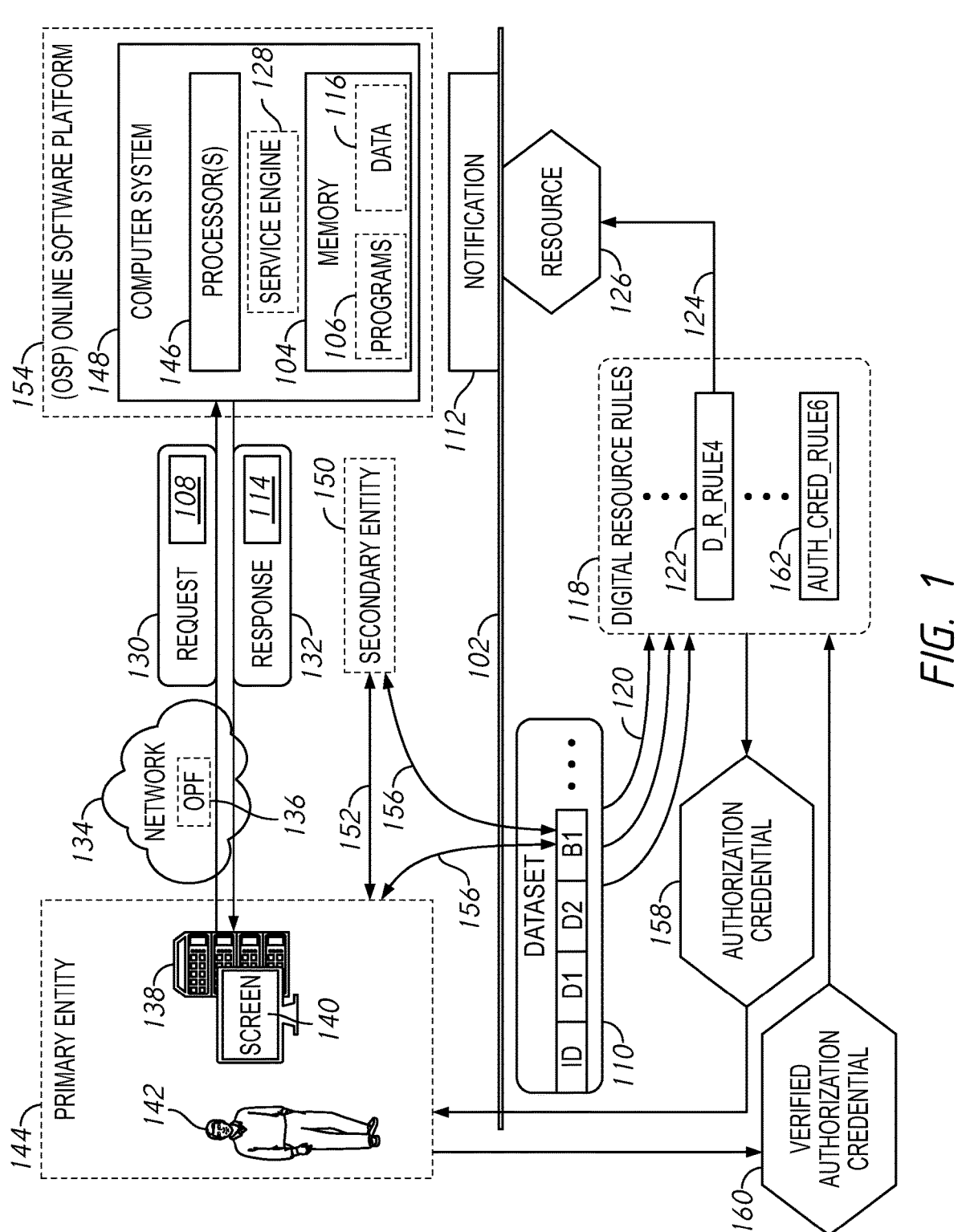
FIG. 1 is a diagram showing sample aspects of embodiments.

It may be cumbersome and time consuming for existing systems to manually obtain powers of attorney or other authorization credentials from the user necessary to act on behalf of the user. Examples described herein may address this and/or other problems by providing computing systems which may efficiently and automatically generate authorization credentials and/or obtain verified authorization credentials. The authorization credentials may be generated by accessing data repositories of rules and/or user attributes that may be used to generate a useful authorization credential, such as a power of attorney.

Advantages of various examples of described technology are discussed herein. It should be understood, however, that advantages are described to facilitate an understanding and appreciation of the described technology. Some examples may not address all, or even any, of the described advantages.

Providing, in a timely and efficient manner, accurate and reliable authorization credentials, such as powers of attorney, presents a technical problem for current ERP applications. Often, obtaining these credentials is overlooked until a later time when it may become more urgent to obtain the credentials. The manner in which the credentials should be generated may be unknown to the ERP system, and accordingly, a conventional computing system may be unable to generate authorization credentials.

Another such problem is providing updated authorization credentials when a user's activity may implicate more than one domain and/or when attributes associated with the user have been updated or changed (e.g., when the user's name changes, a business name changes, and/or when a merger occurs). There may be no mechanism in conventional computing systems for the computing system to recognize the need for an updated authorization credential and/or to automatically generate an authorization credential or obtain a verified authorization credential.

Accessing information for use in an authorization credential, and generating an authorization credential in a manner used by a particular domain in a timely and efficient manner over computer networks and in a way that integrates well into existing technical environments presents an additional technical problem.

The present disclosure provides systems, computer-readable media, and methods that may solve these technical problems by increasing the speed, efficiency and accuracy of such specialized software platforms and computer networks, thus improving the technology of ERP software applications and accounting applications.

Therefore, the systems and methods described herein for generation of authorization credentials may improve the functioning of computer networks or other hardware in that authorization credentials and verified authorization credentials may be efficiently generated and used to establish a trusted connection between the computing system (or an entity associated with the computing system) and another computing system or entity.

By facilitating authorized communication between entities, the described computing systems and methods may improve the functioning of computer or other hardware, such as by reducing the processing, storage, and/or data transmission resources needed to perform various tasks, including verified communication between systems and entities. In this manner, credential generation may be performed with less latency and/or preserving more of the conserved resources for use in performing other tasks or additional instances of the same task.

As shown above and in more detail throughout the present disclosure, the present disclosure provides technical improvements in computer networks to existing computerized systems to provide authorization credentials, verified authorization credentials, including updates to the same. An advantage can be that, with verified authorization credentials timely and automatically generated, they need not be generated at a later time when they may be used to authenticate communications or allow for the acceptance of communications by an entity on behalf of the user. In this manner, time may be saved and more efficient use of computing and other resources may be made.

These and other features and advantages will become more readily apparent in view of the embodiments described and illustrated in this specification, namely in this written specification and the associated drawings and claims.

The present description provides examples of computing systems, storage media that may store programs, and methods.

In an example method, a computing system may receive a request from a user to engage a service offered by the computing system. The computing system may identify a domain implicated by the user request. The computing system may access an electronic repository that may store rules regarding authorization credentials, including rules regarding authorization credentials for the domain. The rules regarding authorization credentials may specify particular attributes for inclusion in the authorization credentials for the domain.

The computing system may access another electronic repository that may store values of attributes associated with the user. The stored values may include values for the particular attributes for inclusion in the authorization credentials for the domain.

Accordingly, the computing system may generate an authorization credential by combining the values of the particular attributes in accordance with the rules regarding authorization credentials for the domain. The computing system may transmit the authorization credential to the user for verification, and receive a verified authorization credential from the user.

The verified authorization credential may be used by the computing system to connect to other computing systems and/or to cause other computing systems or entities to accept data submitted on behalf of the user by the computing system or an entity associated with the computing system.

As has been mentioned, the present description is about computer systems, storage media that may store programs, and methods. Embodiments are now described in more detail.

FIG. 1 is a diagram showing sample aspects of embodiments. A thick horizontal line 102 separates this diagram, although not completely or rigorously, into a top portion and a bottom portion. Above the line 102 are shown elements with emphasis mostly on entities, components, their relationships, and their interactions, while below the line 102 are shown elements with emphasis mostly on processing of data that takes place within one or more of the components that are above the line 102.

Above the line 102, a sample computer system 148 according to embodiments is shown. The computer system 148 has one or more processors 146 and a memory 104. The memory 104 stores programs 106 and data 116. The one or more processors 146 and the memory 104 of the computer system 148 thus implement a service engine 128.

The computer system 148 can be located in "the cloud." In fact, the computer system 148 may optionally be implemented as part of an Online Software Platform (OSP) 154. The OSP 154 can be configured to perform one or more predefined services, for example via operations of the service engine 128. Such services can be searches, determinations, computations, verifications, notifications, the transmission of specialized information, including data that effectuates payments, the generation and transmission of documents, the online accessing of other systems to effect registrations, and so on, including what is described in this document. Such services can be provided in the form of Software as a Service (SaaS). As such, the OSP 154 can be an online service provider. In some examples, the services may include the preparation and/or filing of resources on behalf of clients.

A user 142 may be standalone. The user 142 may use a computer system 138 that has a screen 140, on which User Interfaces (UIs) may be shown. In embodiments, the user 142 and the computer system 138 are considered part of a primary entity 144. In such instances, the user 142 can be an agent of the primary entity 144, and even within a physical site of the entity 144, although that is not necessary. In embodiments, the computer system 138 or other device of the user 142 can be client devices for the computer system 148. The user 142 or the primary entity 144 can be clients for the OSP 154. For instance, the user 142 may log into the computer system 148 by using credentials, such as a user name, a password, a token, and so on. The computer system 138 may be implemented, for example, using a mobile device, such as a smartphone. In some examples, the computer system 138 may be implemented using a desktop, laptop, or server computer. In some examples, the computer system 138 may be implemented using a smart speaker, automobile, and/or appliance.

The computer system 138 may access the computer system 148 via a communications network 134, such as the internet. In particular, the entities and associated systems of FIG. 1 may communicate via physical and logical channels of the communication network 134. For example, information may be communicated as data using the Internet Protocol (IP) suite over a packet-switched network such as the Internet or other packet-switched network, which may be included as part of the communication network 134. The communication network 134 may include many different types of computer networks and communication media, including those used by various different physical and logical channels of communication, now known or later developed. Non-limiting media and communication channel examples include one or more, or any operable combination of: fiber optic systems, satellite systems, cable systems, microwave systems, Asynchronous Transfer Mode ("ATM") systems, frame relay systems, Digital Subscriber Line ("DSL") systems, Radio Frequency ("RF") systems, telephone systems, cellular systems, other wireless systems, and the Internet. In various embodiments the communication network 134 can be or include any type of network, such as a Local Area Network (LAN), a Metropolitan Area Network (MAN), a Wide Area Network (WAN), or the internet. Accordingly, from certain perspectives, the OSP 154 is in the cloud, and is therefore depicted in FIG. 1 within the communication network 134.

Accessing, downloading and/or uploading, and so on may be permitted among these computer systems. Such can be performed, for instance, with manually uploading files, like spreadsheet files, etc. Such can also be performed automatically as shown in the example of FIG. 1, with systems exchanging requests and responses.

Moreover, in some embodiments, data from the computer system 138 and/or from the computer system 148 may be stored in an Online Processing Facility (OPF) 136 that can run software applications, perform operations, and so on. In such embodiments, requests and responses may be exchanged with the OPF 136, downloading or uploading may involve the OPF 136, and so on. In such embodiments, the computer system 138 and any devices of the OPF 136 can be considered to be remote devices, at least from the perspective of the computer system 148.

In some instances, the user 142 and/or the primary entity 144 have instances of relationships with secondary entities. Only one such secondary entity 150 is shown. In this example, the primary entity 144 has a relationship instance 152 with the secondary entity 150.

In some instances, the user 142 and/or the primary entity 144 obtain data about one or more secondary entities, for example as necessary for conducting the relationship instances with them. The primary entity 144 and/or the secondary entity 150 may be referred to as simply entities. One of these entities may have one or more attributes. Such an attribute of such an entity may be any one of its name, type of entity, a physical or geographical location such as an address, a citizenship, a professional title, a contact information element, an affiliation, a characterization of another entity, a characterization by another entity, an association or relationship with another entity (general or specific instances), an asset of the entity, a declaration by or on behalf of the entity, a specific domain that the entity belongs in a context of multiple domains that are defined in terms of the above, and so on.

In some examples, the computer system 148 and/or (OSP) online software platform 154 may be associated with an entity. For example, a corporate entity which operates the service engine 128 to perform services for one or more users, including user 142, may be associated with the computer system 148 and/or (OSP) online software platform 154.

In embodiments, the computer system 148 receives one or more datasets. A sample received dataset 110 is shown below the line 102. The dataset 110 may be received by the computer system 148 in a number of ways. In some embodiments, one or more requests may be received by the computer system 148 via a network. In this example, a request 130 is received by the computer system 148 via the network 134. The request 130 has been transmitted by the remote computer system 138. The received one or more requests can carry payloads. In this example, the request 130 carries a payload 108. In such embodiments, the one or more payloads may be parsed by the computer system 148 to extract the dataset. In this example, the payload 108 can be parsed by the computer system 148 to extract the dataset 110. In this example the single payload 108 encodes the entire dataset 110, but that is not required. In fact, a dataset can be received from the payloads of multiple requests. In such cases, a single payload may encode only a portion of the dataset. And, of course, the payload of a single request may encode multiple datasets. Additional computers may be involved with the network 134, some beyond the control of the user 142 or OSP 154, and some within such control.

In some examples, the request 130 may be a request to engage a service offered by the computer system 148 and/or (OSP) online software platform 154. For example, the request 130 may be a request to use or access one or more services provided by service engine 128, such as reporting and/or filing services.

The dataset 110 has values that can also be called dataset values. The dataset values can be numerical, alphanumeric, Boolean, and so on, as needed for what the values characterize. For example, an identity value ID may indicate an identity of the dataset 110, so as to differentiate it from other such datasets. At least one of the dataset values may characterize an attribute of a certain one of the entities 144 and 150, as indicated by correspondence arrows 156. For instance, a value D1 may be the name of the certain entity, a value D2 may be for relevant data of the entity, and so on. Plus, an optional value B1 may be a numerical base value. The database value B1 can be for an aspect of the dataset, and so on. The aspect of the dataset may be the aspect of a value that characterizes the attribute, an aspect of the reason that the dataset was created in the first place, and so on. The dataset 110 may further have additional dataset values, as indicated by the horizontal dot-dot-dot in the right side of the dataset 110. (Each time, the dot-dot-dot suggests possibly more of what it follows.) In some embodiments, the dataset 110 has values that characterize attributes of both the primary entity 144 and the secondary entity 150, but that is not required.

In embodiments digital resource rules 118 are provided for use by the OSP 154. In the example of this diagram, only two sample digital resource rules are shown explicitly, namely rule D_R_RULE4 122 and auth_cred_rule6 162. All other such rules are indicated by the vertical dot-dot-dots. These rules 118 are digital in that they are implemented for use by software. For example, these rules 118 may be implemented (e.g., stored) within programs 106 and/or data 116. The data portion of these rules 118 may alternately be stored in memories, local or in other places that can be accessed by the computer system 148. The storing can be in the form of a spreadsheet, a database, etc.

In embodiments, the computer system 148 may access the stored digital resource rules 118. This accessing may be performed responsive to the computer system 148 receiving a dataset, such as the dataset 110.

Then the computer system 148 may select a certain one of the accessed digital resource rules 118. In this example, the rule D_R_RULE4 122 is thus selected as the certain digital resource rule. The selection of this particular rule is indicated also by the fact that an arrow 124 begins from that rule. The arrow 124 is described in more detail later in this document.

The computer system 148 may thus select the certain rule D_R_RULE4 122 responsive to one or more of the dataset values of the dataset 110. The impact of the dataset 110 in the selection is indicated by at least some of the arrows 120. The computer system 148 may select the rule auth_cred_rule6 162. All or a portion of the data in the request 130 (e.g., in the dataset 110) may impact the selection of the auth_cred_rule6 162 as is indicated by at least some of the arrows 120.

The computer system 148 may produce a resource for and/or based on the dataset 110, and/or other data retrieved by the computer system 148, such as the resource 126. The computer system 148 may thus produce the resource by applying the certain digital resource rule, which was previously selected, to at least one of the dataset values of the dataset 110. In the example of FIG. 1, the resource 126 is produced for the dataset 110 by the computer system 148 applying the certain digital resource rule D_R_RULE4 122, as indicated by the arrow 124. The impact of the dataset 110 in producing the resource 126 is indicated by at least one of the arrows 120.

An example of a resource which may be produced in accordance with examples described herein is an authorization credential, such as authorization credential 158. The computer system 148 may produce the authorization credential 158 by applying a rule regarding authorization credentials, such as auth_cred_rule6 162. The computer system 148 may select the rule used to produce the authorization credential 158 in accordance with the request 130. The computer system 148 may select the rule used to produce the authorization credential 158 in accordance with data included in the request 130, and/or other data accessed by the computer system 148. In some examples, the request 130 and/or other data associated with the user 142 and/or primary entity 144 may indicate the request pertains to one or more domains. The computer system 148 may select an authorization credential rule, such as auth_cred_rule6 162, based on the one or more domains implicated by the request.

The produced resource can be a document, a determination, a computational result, etc., made, created or prepared for the user 142, and/or the primary entity 144, and/or the secondary entity 150, etc. As such, in some embodiments, the resource is produced by processing and/or a computation. In some embodiments, therefore, the resource is produced on the basis of a characterized attribute of the primary entity 144 and/or the secondary entity 150. In some examples, the authorization credential 158 may be produced using value(s) of one or more attributes of the user 142, primary entity 144, and/or secondary entity 150. The authorization credential rule for a particular domain, such as auth_cred_rule6 162, may specify which attributes will be included in the authorization credential 158. In some examples, the computer system 148 may receive values of one or more attributes in data received from the user, such as dataset 110. In some examples, the computer system 148 may access an electronic repository (e.g., one or more memories and/or storage devices) which may store values of attributes for the user 142 and/or primary entity 144 and/or secondary entity 150.

The resource may be produced in a number of ways. For instance, at least one of the dataset values of the dataset 110 can be a numerical base value, e.g. B1, as mentioned above. In such cases, applying the certain digital resource rule may include performing a mathematical operation on the base value B1. For example, applying the certain digital resource rule may include multiplying the numerical base value B1 with a number indicated by the certain digital resource rule. Such a number can be, for example, a percentage, e.g., 1.5%, 3%, 5%, and so on. Such a number can be indicated directly by the certain rule, or be stored in a place indicated by the certain rule, or by the dataset 110, and so on.

In some examples, a resource may be produced by combining values of attributes in a manner specified by one or more rules. For example, the computer system 148 may produce the authorization credential 158 in part by combining value(s) of particular attributes for the user 142 and/or primary entity 144 and/or secondary entity 150. The values may be combined in accordance with an authorization rule, such as auth_cred_rule6 162. The computer system 148 may combine the value(s) of the attribute(s) by, for example, formatting the value(s) of the attribute(s) in a particular manner as specified by the authorization rule. In some examples, the computer system 148 may combine the value(s) of the attribute(s) by, for example, inserting or other-wise placing the value(s) of the attribute(s) in particular location(s) in a document or electronic file as specified by the authorization rule.

In some embodiments two or more digital main rules may be applied to produce the resource. For example, the computer system 148 may select, responsive to one or more of the dataset values, another one of the accessed digital resource rules 118. These one or more dataset values can be the same as, or different than, the one or more dataset values responsive to which the first selected rule was selected. In such embodiments, the resource can be produced by the computer system 148 also applying the other selected digital resource rule to at least one of the dataset values. For instance, where the base value B1 is used, applying the first selected rule may include multiplying the numerical base value B1 with a first number indicated by the first selected rule, so as to compute a first product. In addition, applying the second selected rule may include multiplying the numerical base value B1 with a second number indicated by the second selected rule, so as to compute a second product. And, a value of the resource may be produced by summing the first product and the second product.

In some examples, a verified authorization credential may be received by systems and methods described herein. For example, the verified authorization credential 160 may be received. The computer system 148 may make the authorization credential 158 available to a user, such as by transmitting the authorization credential 158 to computer system 138 and/or allowing the authorization credential 158 to be accessed and/or retrieved by computer system 138. The authorization credential 158 may, for example, be displayed on screen 140. The computer system 148 may cause the authorization credential 158 to be displayed on the screen 140 in some examples.

The user 142 may augment the authorization credential 158 in order to generate a verified authorization credential, such as verified authorization credential 160. For example, the user 142 may sign the authorization credential 158 (e.g., the user 142 may combine an ink and/or electronic signature with the authorization credential 158). The user 142 may in some examples verify the credential by utilizing one or more login and password combinations and/or placing the authorization credential on a block chain or any other verification mechanism. The verified authorization credential 160 may be provided to the computer system 148. For example, the computer system 138 may transmit the verified authorization credential 160 to the computer system 148.

In embodiments, a notification can be caused to be transmitted, e.g. via the network 134, by the computer system 148. In the example of FIG. 1, a notification 112 can be caused to be transmitted by the computer system 148, for example as an answer or other response to the received dataset 110. In some examples, the notification may be the verified authorization credential 160 and/or may include the verified authorization credential 160.

The notification can be about an aspect of the resource, and possibly not about the whole resource. Or, the notification can be about the whole resource. Or, the notification may be unrelated to the resource. That is why the resource 126 is not depicted in FIG. 1 as being entirely with the notification 112. In particular, the notification 112 may inform about the aspect of the resource 126, namely that it has been determined, or where it can be found, or what it is, or a portion of its content, or a value of it, or a statistic of the value, or a rounded version of the value, and so on. Of course, the planning should be such that the recipient of the notification 112 understands what it is being provided.

The notification 112 can be transmitted to one of an output device and another device. The output device may be the screen of a local user or a remote user. The notification 112 may thus cause a desired image, message, or other such notification to appear on the screen, such as within a Graphical User Interface (GUI) and so on. The other device can be the remote device, from which the dataset 110 was received, as in the example of FIG. 1. In particular, the computer system 148 may cause the notification 112 to be communicated by being encoded as a payload 114, which is carried by a response 132. In some examples, the computer system 148 may cause the authorization credential 158 to be communicated by being encoded as payload 114. A further request or other communication may cause the verified authorization credential 160 to be communicated by being encoded as another payload and transmitted to the computer system 148. The response 132 may be transmitted via the network 134 responsive to the received request 130. The response 132 may be transmitted to the computer system 138, or to OPF 136, and so on. As such, the other device can be the computer system 138, or the OPF 136, or the screen 140 of the user 142, and so on. In this example the single payload 114 encodes the entire notification 112, but that is not required. Similarly with what is written above about encoding datasets in payloads, the notification 112 instead may be provided via two or more payloads, or in other cases the notification 112 and at least one other notification may be included in the same single payload. Along with the aspect of the resource 126, it can be advantageous to embed in the payload 114 the identity value (ID) and/or one or more values of the dataset 110. This will help the recipient correlate the response 132 to the request 130, and therefore match the received aspect of the resource 126 as the answer or other response to the appropriate dataset.

In some examples, the verified authorization credential 160 may be provided to another computing system operated by another entity. For example, the computer system 148 may provide (e.g., transmit) the verified authorization credential 160 to another computing system operated by a secondary entity. The secondary entity may be in a domain that utilizes the rules regarding authorization credentials which were used to generate verified authorization credential 160. The computer system 148 and/or entity associated with the computer system 148 may subsequently provide data to the secondary entity, such as to a computing system associated with the secondary entity. The verified authorization credential 160 may cause the computing system associated with the secondary entity to accept the data from computer system 148 on behalf of user 142.

As seen above, the computer system 138, the computer system 148, and possibly also the OPF 136 may exchange requests and responses. Such can be implemented with a number of different architectures. Two examples are now described with reference to the computer systems 138 and 148 only.

In one such architecture, a device remote to the service engine 128, such as the computer system 138, may have a certain application (not shown) and a connector (not shown) that is a plugin that sits on top of that certain application. The connector may be able to fetch from the remote device the details required for the service desired from the OSP 154, form an object or payload (e.g. 108), and then send or push a request (e.g. 130) that carries the payload to the service engine 128 via a service call. The service engine 128 may receive the request with its payload. The service engine 128 may then access the digital resource rules 118, find the appropriate one(s) of them, and apply it or them to the payload to produce the requested resource 126. The service engine 128 may then form a payload (e.g. 114) that includes an aspect of the resource 126, and then push, send, or otherwise cause to be transmitted a response (e.g. 132) that carries the payload it formed to the connector. The connector receives the response, reads its payload, and forwards that payload to the certain application.

An alternative such architecture uses Representational State Transfer (REST) Application Programming Interfaces (APIs). REST or RESTful API design is designed to take advantage of existing protocols. While REST can be used over nearly any protocol, it usually takes advantage of Hyper Text Transfer Protocol (HTTP) when used for Web APIs. In such an alternative architecture, a device remote to the service engine 128, such as the computer system 138, may have a particular application (not shown). In addition, the computer system 148 implements a REST API (not shown). This alternative architecture enables the primary entity 144 to directly consume a REST API from their particular application, without using a connector. The particular application of the remote device may be able to fetch internally from the remote device the details required for the service desired from the OSP 154, and thus send or push the request 130 to the REST API. In turn, the REST API talks in the background to the service engine 128. Again, the service engine 128 determines the requested resource 126, and sends an aspect of it back to the REST API. In turn, the REST API sends the response 132 that has the payload 114 to the particular application.

Referring again to the digital resource rules 118, digital rules in embodiments can be expressed in the form of a logical "if-then" statement, such as: "if P then Q". In such statements, the "if" part, represented by the "P", is called the condition, and the "then" part, represented by the "Q", is called the consequent. In a set of digital rules, the condition or the consequent may be repeated. For instance, the condition can be the same for multiple different rules. And the consequent can be the same for multiple different rules.

Searching for a rule that applies can be performed by searching for whether or not the rule's one or more conditions are met. The computer system may recognize that such a condition is met. For instance, the certain condition could define a domain, such as a boundary of a region that is within a space. The region could be geometric, and be within a larger space. The region could be geographic, within the space of a city, a state, a country, a continent or the earth. The boundary of the region could be defined in terms of numbers according to a coordinate system within the space. In the example of geography, the boundary could be defined in terms of groups of longitude and latitude coordinates. For instance, the attribute could be a location of the entity, and the one or more values of the dataset 110 that characterize the location could be one or more numbers or an address, or longitude and latitude. A condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

The search can be iterative through all the digital rules of a set of rules or of a subset of rules. Sometimes once the condition of one rule is met, its consequent is applied, and the search effectively stops. Other times, all eligible rules are searched, and those whose conditions are met are marked for later consideration and application, for instance by proper implementation of the consequent.

The digital resource rules 118 includes the rule D_R_RULE4 122 that is eventually selected and applied. In some embodiments, the rules 118 are implemented by simple rules. A simple rule has a single condition ("P"), and a single consequent ("Q"). As a result of an initial search, then, the digital resource rule D_R_RULE4 122 is selected, and then its consequent is applied to produce the resource.

In some embodiments, the rules 118 further include additional digital resource rules that select that digital resource rule D_R_RULE4 122 in the first place, for ultimately applying it. In such embodiments, the rules 118 can be implemented as simple rules or as complex rules. Complex rules may have more than conditions, and/or more than one consequents. Complex rules may be implemented as individual single rules with complex coding. Alternatively, a complex rule may be implemented in part by more than one simpler individual rules, which can have hierarchical relationships among them, e.g. from one rule's application or execution leading to another, and so on. As a result of the initial search, then, rules are found which, when applied, select that certain rule in the first place.

In some examples, one or more authorization rules may be included in digital resource rules 118, such as auth_cred_rule6 162. The authorization rule(s) may include rules regarding authorization credentials for a particular domain, such as an identification of particular attributes for inclusion in an authorization credential for the domain. Searching for an authorization rule that applies can be performed by searching for whether or not the domain that the authorization rule pertains to is implicated by a user request, such as by request 130. Sometimes once a domain implicated by a request is located, its authorization is used and the search effectively stops. Other times, all eligible rules may be searched and all authorization rules which may pertain to any domain implicated by request 130 may be used. For example, the computer system 148 may generate an authorization credential for each domain implicated by request 130.

In some examples, the computer system 148 may determine one or more domains implicated by a user request, such as by request 130. Domains may be determined, for example, by using digital resource rules 118. In some examples, a location of origin of the request 130 may be used to identify a domain implicated by the request 130. In some examples, a service requested by the request 130 may be used to identify one or more domains implicated by the request 130. For example, the request 130 itself may request services within one or more domains.

Figure 2:
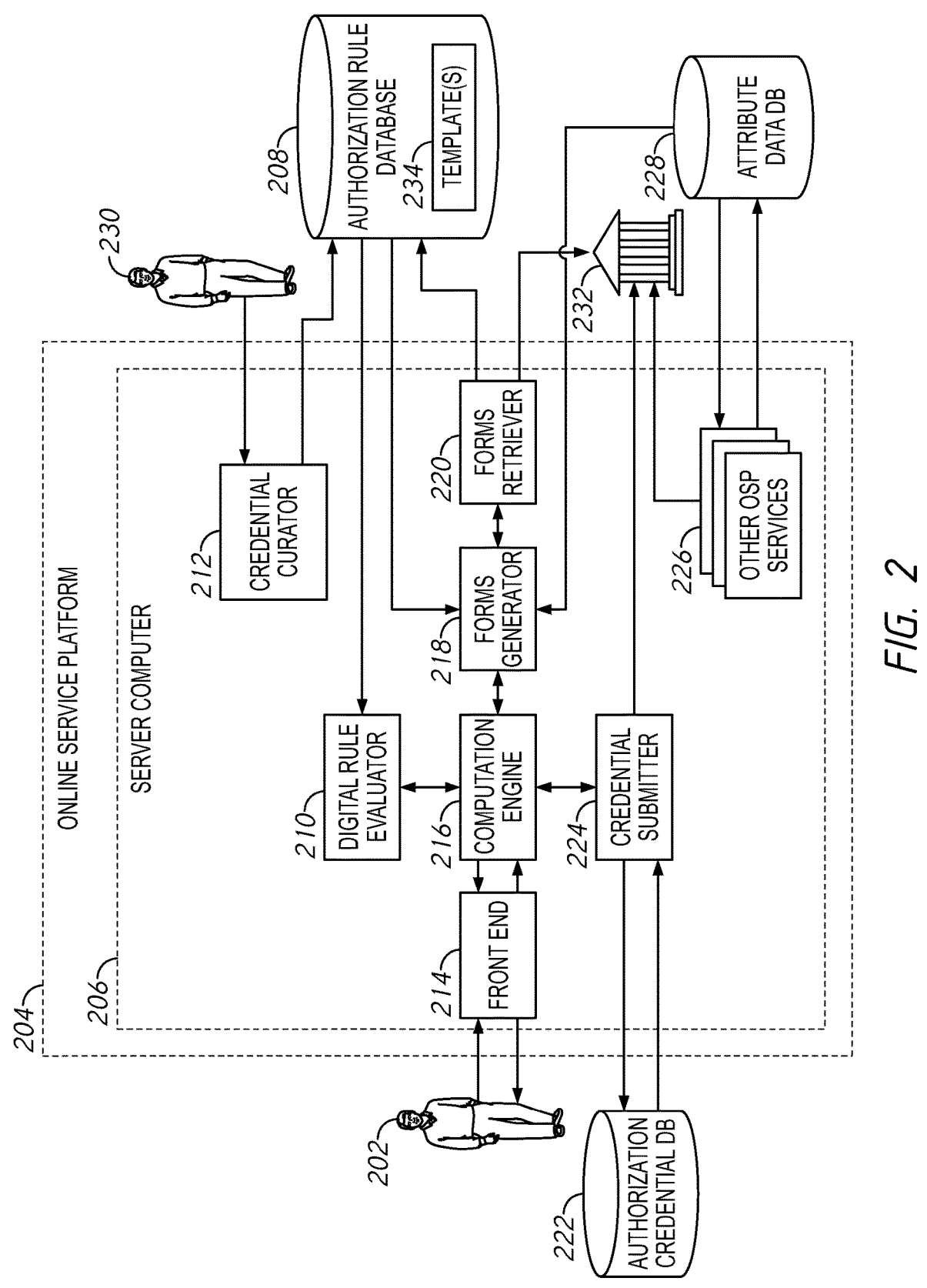
FIG. 2 is a schematic illustration of a system arranged in accordance with examples described herein.

FIG. 2 is a schematic illustration of a system arranged in accordance with examples described herein. The system of FIG. 2 includes an online service platform 204, which may include server computer 206. The server computer 206 includes credential curator 212, digital rule evaluator 210, front end 214, computation engine 216, forms generator 218, forms retriever 220, credential submitter 224, and other OSP services 226. The server computer 206 may include and/or be in communication with authorization credential database 222, authorization rule database 208, and attribute data database 228. The authorization rule database 208 may include template(s) 234. The server computer 206 may be in communication with user 202, expert user 230, and/or domain 232.

The system of FIG. 2 may be used to wholly and/or partially implement the system of FIG. 1. For example, the server computer 206 may be used to implement and/or may be implemented by the computer system 148. The online service platform 204 may be used to implement and/or may be implemented by the (OSP) online software platform 154. The user 202 may utilize a computing system, such as computer system 138 of FIG. 1.

The components shown in FIG. 2 are exemplary only. Additional, fewer, and/or different components may be used in other examples.

The server computer 206 may include one or more processor(s) and one or more computer readable media. For example, the server computer 206 may include processor(s) 146 of FIG. 1 and memory 104. The memory may be encoded with executable instructions which, when executed by the processor(s) may implement the components shown as included in the server computer 206 of FIG. 2. For example, digital rule evaluator 210, credential curator 212, front end 214, computation engine 216, forms generator 218, forms retriever 220, credential submitter 224, and/or other OSP services 226 may be implemented using software (e.g., executable instructions stored on one or more computer readable media which, when executed cause the server computer 206 to perform the described actions).

Examples of computing systems described herein may include a credential curator, such as credential curator 212 of FIG. 2. The credential curator 212 may be implemented in software, and may function to obtain and/or generate one or more authorization rules and/or templates for authorization credentials. In some examples, an expert user 230, such as a person or other computer process, may provide updated information regarding authorization credentials for one or more domains. In some examples, the expert user 230 may be an expert in powers of attorney documents. The credential curator 212 may generate a template in accordance with the information regarding the authorization credential, and may store the template(s) in authorization rule database 208. In some examples, the information provided to and/or obtained by the credential curator 212 may include one or more attributes to include in an authorization credential for a particular domain. The authorization rule database 208 may accordingly include an inventory of power of attorney requirements by state and/or local jurisdiction. The inventory may be provided across various tax types.

Examples of computing systems described herein may accordingly include an electronic repository of authorization rules and/or templates. For example, the server computer 206 may be in communication with authorization rule database 208, which may store template(s) 234. The authorization rule database 208 may store authorization rules which may indicate, for a particular domain, what attributes should be included in an authorization credential. One or more authorization credential templates may be stored in the authorization rule database 208. The templates may be documents in some examples, such as MICROSOFT WORD, MICROSOFT EXCEL, ADOBE PDF, or other types of documents. The authorization rule database 208 may generally be implemented using any electronic repository, including, one or more databases, electronic storage devices, and/or cloud storage systems.

Examples of systems described herein may include a front end, such as front end 214. The front end 214 may be used to receive requests from and/or provide responses to one or more users, such as user 202 of FIG. 1. For example, the front end 214 may receive request 104 of FIG. 1 in some examples and may provide response 132 of FIG. 1. The front end 214 may be implemented using, for example, one or more API endpoints, communication interfaces, or other components. The front end 214 may receive a request from user 202 to engage one or more services offered by online service platform 204 and/or server computer 206. For example, the front end 214 may receive a request from user 202 to engage one or more other OSP services 226.

Examples of systems described herein may include a computation engine, such as computation engine 216 of FIG. 2. The computation engine 216 may be implemented using and/or may be used to implement the processor(s) 146 of FIG. 1 in some examples. The computation engine 216 may be implemented using processing circuitry, including but not limited to, one or more processor(s) (e.g., central processing units (CPUs), graphics processing units (GPUs), application specific integrated circuits (ASICs), and/or field programmable gate arrays (FPGAs)). The computation engine 216 may be used to generate authorization credentials described herein. The computation engine 216 may be used to receive verified authorization credentials described herein. The computation engine 216 may be used to parse or otherwise analyze responses and/or requests described herein. For example, the computation engine 216 may be used to identify, based on a request, a domain implicated by the request. For example, a requested service may pertain to a particular domain. In some examples, multiple domains may be implicated by a user request (e.g., multiple services may be requested and/or a service may be requested which provides resources and/or notifications to multiple domains). The computation engine 216 may identify multiple domains associated with a user request.

Examples of systems described herein may include a digital rule evaluator, such as digital rule evaluator 210 of FIG. 2. The digital rule evaluator 210 may be implemented using software and may receive information from computation engine 216, such as information regarding one or more domains implicated by a request. The digital rule evaluator 210 may evaluate rules in the authorization rule database 208 to identify attributes and/or template(s) for use in generating authorization credentials for the implicated domains. Accordingly, the digital rule evaluator 210 may access the authorization rule database 208 and may identify one or more rules regarding authorization credentials for the domain implicated by a user request. The rules may include rules regarding authorization credentials for the domain, including particular attributes for inclusion in the authorization credentials for the domain.

Examples of systems described herein may include a forms retriever, such as forms retriever 220 of FIG. 2. The forms retriever 220 may be implemented using software and may retrieve one or more template authorization credentials from other computing systems. For example, the forms retriever 220 may retrieve a template authorization credential from a domain 232. The domain 232 may be implemented, for example, using a computing system operated by a governmental entity in the domain or other system having knowledge of the form of authorization credentials for a particular domain. The forms retriever 220 may retrieve the template and may store the template in authorization rule database 208 (e.g., template(s) 234).

Examples of systems described herein may include a forms generator, such as forms generator 218 of FIG. 2. The forms generator 218 may be implemented using software and may obtain a form relevant to a particular domain from the authorization rule database 208. For example, the forms generator 218 may receive identification of a particular domain relevant to a request from the computation engine 216 and/or digital rule evaluator 210. The forms generator 218 may access an authorization rule and/or template for the domain from authorization rule database 208. The forms generator 218 may identify attributes to be included in an authorization credential for the domain as specified by the authorization rule and/or template.

Examples of systems described herein may include and/or be in communication with an electronic repository which may store attribute data. The attribute data may be obtained during operation of server computer 206 and/or online service platform 204. For example, as users make use of server computer 206 and/or online service platform 204, the systems may obtain various information about the users and/or corporations or other entities associated with the users. The information may be obtained and/or generated, for example, during operation of other OSP services 226. The other OSP services 226 may be implemented, for example, using service engine 128 of FIG. 1. The other OSP services 226 may be used to generate one or more resources, such as resource 126 of FIG. 1. The other OSP services 226 may be used to prepare and/or file one or more tax returns. Attribute data may be stored in an electronic repository such as attribute data database 228. The attribute data may include a value of an attribute (e.g., a numerical value and/or a string) and an association with the attribute. Accordingly, a user's name (e.g., first name, last name, and/or middle name), address, title, business address, geographic location, business name, business size, revenue, or other attribute data may be stored in attribute data database 228.

Examples of forms generators described herein, such as forms generator 218 may operate, together with computation engine 216 in some examples, to populate a template with values of attributes specified by a digital rule for a domain. The forms generator 218 and/or computation engine 216 may access the attribute data database 228. The forms generator 218 and/or computation engine 216 may obtain, from the attribute data database 228, values of attributes to be included in an authorization credential in accordance with the rules for the authorization credential for that domain as specified by the authorization rule database 208 and/or digital rule evaluator 210. The forms generator 218 may combine values of the particular attributes for the user in accordance with a rule regarding authorization credentials for the domain. The forms generator accordingly may populate one or more templates with data retrieved from attribute data database 228. In this manner, the forms generator 218 and/or computation engine 216 may generate an authorization credential. In some examples, the forms generator 218 and/or computation engine 216 may generate multiple authorization credentials by combining values of particular attributes for the user in accordance with respective rules regarding authorization credentials for each of multiple domains. Note in this example that the forms generator 218 and/or computation engine 216 may access values of particular attributes a single time and utilize the values in multiple authorization credentials in examples where a same attribute may be used in authorization credentials for multiple domains.

The computation engine 216 may provide (e.g., transmit) the authorization credential to the user 202. For example, the computation engine 216 may transmit the authorization credential to a computing system accessible to the user 202. The computation engine 216 may cause the authorization credential to be displayed on a display of a computing system accessible by the user 202. The computing system accessible by the user may be implemented as a mobile device in some examples. Other computing systems may also be used including one or more desktops, laptops, tablets, or wearable devices. In some examples, prior to transmitting the authorization credential to the user for verification, the computation engine 216 may access (automatically access in some examples) additional data regarding the user. For example, the computation engine 216 may have access to additional sources of data regarding the user and/or the computation engine 216 may again access the attribute data database 228 at a second time to again access values of attributes used in the authorization credential. The computation engine 216 may correct at least one discrepancy between the authorization credential and the additional data accessed. For example, the additional source of data may indicate a different value of an attribute for the user, and the computation engine 216 may replace the value of the attribute in the initially generated authorization credential with the subsequently accessed value. The computation engine 216 may receive (e.g., through the front end 214), a verified authorization credential which may include an augmentation (e.g., a signature) made by the user 202 to the authorization credential. The computation engine 216 may store the authorization credentials and/or verified authorization credentials in an electronic repository, such as authorization credential database 222. The authorization credential database 222 may also store an effective date of each authorization credential and/or an expiration (e.g., renewal date) for each authorization credential.

Examples of systems described herein may include one or more credential submitters, such as credential submitter 224. The credential submitter 224 may be implemented using software and may retrieve a particular verified authorization credential from the authorization credential database 222 and/or may receive a verified authorization credential from the computation engine 216. The credential submitter 224 may transmit a verified authorization credential to another computing system, such as a computing system of domain 232. In some examples, a verified authorization credential may be stored for a period of time before it is transmitted to the domain 232 (e.g., before it may be requested, used, and/or needed). In some examples, the credential submitter 224 may automatically access additional data regarding the user 202. For example, the credential submitter 224 may again access the attribute data database 228. The credential submitter 224 and/or computation engine 216 may determine a change has occurred in the value of at least one attribute since the time the authorization credential and/or verified authorization credential was generated. For example, the user's name may have changed, a business name may have changed, and/or a merger may have occurred. Accordingly, the computation engine 216 may transmit to the user 202 a notification to update the authorization credential. In some examples, the computation engine 216 may generate an updated authorization credential and may provide the updated authorization credential to the user for verification. In some examples, the credential submitter 224 and/or computation engine 216 may determine that a power of attorney has expired (e.g., a renewal date is approaching and/or has occurred). Accordingly, the computation engine 216 may transmit to the user 202 a notification to update the authorization credential.

The domain 232 may be implemented as or operated by a secondary entity, such as an governmental entity. The domain 232 may be a domain which utilizes particular rules for authorization credentials. In this manner, a verified authorization credential for a particular domain for a particular user may be provided to a computing system or other authority of the domain. The receipt of a verified authorization credential by the domain may allow for an entity (e.g., server computer 206 and/or online service platform 204) to provide data to the domain on behalf of the user 202.

FIG. 3 is a flowchart of an example method arranged in accordance with examples described herein. The method 300 includes block 302, "computing system identifies domain implicated by request." Block 304, "computing system accesses rules regarding authorization credentials for the domain" may follow block 302. Block 306, "user may be represented by OSP?" may follow block 304. If a user may not be represented by the OSP, block 308 "return authorization credential which are needed but don't require OSP representation" may follow block 306. If a user may be represented by the OSP, block 310 "return authorization credentials for OSP to represent user" may follow block 306. Block 312, "computing system determines attributes for authorization credential" may follow block 310. Block 314, "computing system sends authorization credential to client" may follow block 312. Block 316, "client sends back verified authorization credential" may follow block 314. Block 318 "computing system stores the verified authorization credential" may follow block 316.

The method 300 may be implemented by one or more computing systems described herein, such as those depicted and described with reference to FIG. 1 and/or FIG. 2. The blocks shown in FIG. 3 are exemplary only. Additional, fewer, and/or different blocks may be used in other examples. The method 300 may be implemented wholly and/or partially using software. For example, one or more non-transitory computer readable media may be provided encoded with instructions which, when executed by one or more processors, cause the one or more processors to perform some or all of the actions shown in method 300.

Block 302 recites "computing system identifies domain implicated by request." The block 302 may be implemented, for example, by computer system 148 of FIG. 1 and/or server computer 206 of FIG. 2. The computing system may receive a request from a user. The request may include a request to engage one or more services offered by the computing system, such as by an OSP. The computing system may identify a domain implicated by the request in block 302. For example, the computing system may identify a domain in which the user providing the request is located and/or does business. The identification may be based on information in the request and/or information accessible to the computing system (e.g., accessed in the attribute data database 228 or other database accessible to the computing system). The computing system may identify a domain where the requested service may be providing data (e.g., a government entity). Accordingly, the identification in block 302 may be based on the service requested by the user in some examples.

While a single domain is referenced in block 302, in some examples, multiple domains implicated by a request, or implicated by multiple requests, may be identified in block 302. For example, a user may provide multiple requests, each of which implicate one or more domains. Multiple domains implicated by one or more requests provided by a user may be identified in block 302 in some examples.

Block 304 recites "computing system accesses rules regarding authorization credentials for the domain." Block 304 may be implemented, for example, by computer system 148 of FIG. 1. The computer system 148 may access digital resource rules 118, such as auth_cred_rule6 162. Block 304 may be implemented, for example, by server computer 206 of FIG. 2 which may access authorization rule database 208. For example, the digital rule evaluator 210 and/or forms generator 218 may access the authorization rule database 208 in block 304. Accordingly, in block 304 digital rules for the domain identified in block 302 may be accessed. The rules may specify one or more attributes for inclusion in an authorization credential for the domain.

Block 306 recites "user may be represented by OSP?". Accordingly, in block 306 a computing system may determine whether, based on one or more requests received from a user, the user may at some point in time be represented by the computing system, such as an OSP, or by an entity representing or otherwise associated with the OSP. For example, in block 306 the computing system may determine whether a particular service requested may utilize the computing system, OSP, or other entity associated with the computing system, to provide data to one or more entities on behalf of the user (e.g., to prepare or file one or more tax returns). In some examples, in order for the computing system, OSP, or an entity associated with the computing system or OSP (such as an owner or employee of a company owning or operating the computing system or OSP), to provide data to another party on behalf of the user, an authorization credential may be used and/or required.

Computing systems described herein may be used to implement block 306. For example, computer system 148 of FIG. 1 may implement block 306 in some examples. Server computer 206 of FIG. 2 may implement block 306 in some examples. For example, the computation engine 216 may implement block 306. In some examples, the digital rules may specify whether representation of the user may be advantageous, required, and/or used. Accordingly, digital resource rules 118 of FIG. 1 and/or authorization rule database 208 of FIG. 2 may in some examples be accessed to implement block 306.

When a user will not be represented by the computing system (e.g., the OSP), or will be unlikely to be represented by the computing system (or entity associated with the computing system), the method 300 may proceed to block 308. In block 308 authorization credentials may be returned which are needed or useful but which do not involve the OSP. Block 308 may be implemented by computer system 148 of FIG. 1 and/or server computer 206 of FIG. 2 in some examples. For example, the forms retriever 220 and/or forms generator 218 of FIG. 2 may be used to implement block 308. The authorization credentials returned in block 308 may be provided to the user, such as through the front end 214 of FIG. 2.

In some examples, block 306 and/or block 308 may be optional. For example, the computing system may not check or otherwise determine whether a user is likely to be represented by a domain before proceeding to block 310 in some examples.

When a user will be represented by the computing system (e.g., the OSP), or will be likely to be represented by the computing system (or entity associated with the computing system), the method 300 may proceed to block 310. In block 310 authorization credentials may be returned for the computing system (e.g., the OSP) to represent the user. Block 310 may be implemented by computer system 148 of FIG. 1 and/or server computer 206 of FIG. 2 in some examples. For example, the forms retriever 220 and/or forms generator 218 of FIG. 2 may be used to implement block 310. Accordingly, in block 310 one or more templates may be retrieved, e.g., from authorization rule database 208 of FIG. 2.

In block 312, the computing system may determine attributes for use in the authorization credential. For example, the attributes for use may be specified by the one or more rules accessed in block 304. In block 312, values for the attributes may be determined. For example, the attribute data database 228 of FIG. 2 may be accessed. Block 312 may be implemented by the computer system 148 of FIG. 1 and/or server computer 206 of FIG. 2 in some examples. For example, the forms generator 218 of FIG. 2 may access the attribute data database 228. The values of the attributes accessed may be combined to generate an authorization credential in block 312. For example, the values of the attributes may be inserted into or otherwise incorporated into a template for the authorization credential. The forms generator 218 of FIG. 2 may be utilized to do the combining, for example.

In some examples, the values of the attributes used in the authorization credential may be double checked. For example, some time may pass in some examples between block 312 and block 314. The values of the attributes may be re-checked (e.g., accessed again, such as in attribute data database 228) prior to block 314. If a discrepancy is found (e.g., by forms generator 218 of FIG. 2), the discrepancy may be corrected prior to block 314. For example, the more recently accessed value for the attribute may be replaced in the authorization credential. In some examples, the value of the attribute may be retrieved from more than one location. For example, the forms generator 218 may access the attribute data database 228 to determine values for attributes, but the forms generator 218 or other computing system component may access another source of attribute values—such as a public database, or other database accessible to the computing system. If a discrepancy in attribute values is identified, the discrepancy may be corrected in the authorization credential by updating the authorization credential, such as by utilizing the more recent value (e.g., the values may each be associated with a time stamp, and the value having the most recent time stamp may be used). In some examples, the computing system may send a communication to the user requesting that the user identify the correct value of the attribute when a discrepancy is identified. The value of the attribute that the user identifies as correct may be utilized in the authorization credential.

In block 314, the computing system may send the authorization credential to the client (e.g., the user). The authorization credential may be transmitted to the user, such as by transmitting the authorization credential to a computing system used or accessed by the user. The computing system used or accessed by the user may be a mobile device in some examples. The computer system 148 of FIG. 1 and/or the server computer 206 of FIG. 2 may be used to implement block 314. For example, the computer system 148 may transmit the authorization credential to the computer system 138 in block 314. In some examples, the server computer 206 of FIG. 2 may transmit the authorization credential to the user using front end 214. In some examples, the authorization credential may be stored (e.g., in authorization credential database 222 of FIG. 2) and accessed by the user responsive to a connection request by the user.

In block 316, the client may return a verified authorization credential. To provide a verified authorization credential, the user may provide an augmentation to the authorization credential (e.g., a signature). In some examples, the authorization credential may be displayed using a computing system accessed by the user. The user may input the augmentation to the computing system. The user may return the authorization credential by sending the verified authorization credential to the OSP. For example, the computer system 138 of FIG. 1 may send the verified authorization credential 160 to the computer system 148. In some examples, the user 202 may utilize a computing system to provide a verified authorization credential to the server computer 206.

In block 318, the computing system may store the verified authorization credential. For example, the server computer 206 of FIG. 2 may store the verified authorization credential in authorization credential database 222. The verified authorization credential may be utilized in a variety of ways. In some examples, the verified authorization credential may be transmitted to another computing system which may be associated with the domain for which is was created. For example, the computer system 148 of FIG. 1 may provide the verified authorization credential 160 to a computing system associated with the domain. In another example, the server computer 206 of FIG. 2 may provide the verified authorization credential to a computing system associated with the domain, e.g., domain 232. Once the computing system associated with the domain has received the verified authorization credential, it may cause the domain to accept data or communications on behalf of the user which are made by the OSP or other entity associated with the computing system which generated the verified authorization credential.

In some examples, over time, computing systems described herein may monitor attributes used in verified authorization credentials generated by the computing systems. For example, the authorization credential database 222 may include a record of attributes used in the stored authorization credentials. The server computer 206 of FIG. 2 may periodically (e.g., at regular intervals and/or responsive to a request) access values of the attributes used in the authorization credentials, such as by accessing attribute data database 228. If a change of attribute value is determined, a computing system may transmit a notification to the user indicating that the authorization credential should be updated. An updated authorization credential utilizing the updated value of the attribute may be sent to the user for verification.

Figure 4:
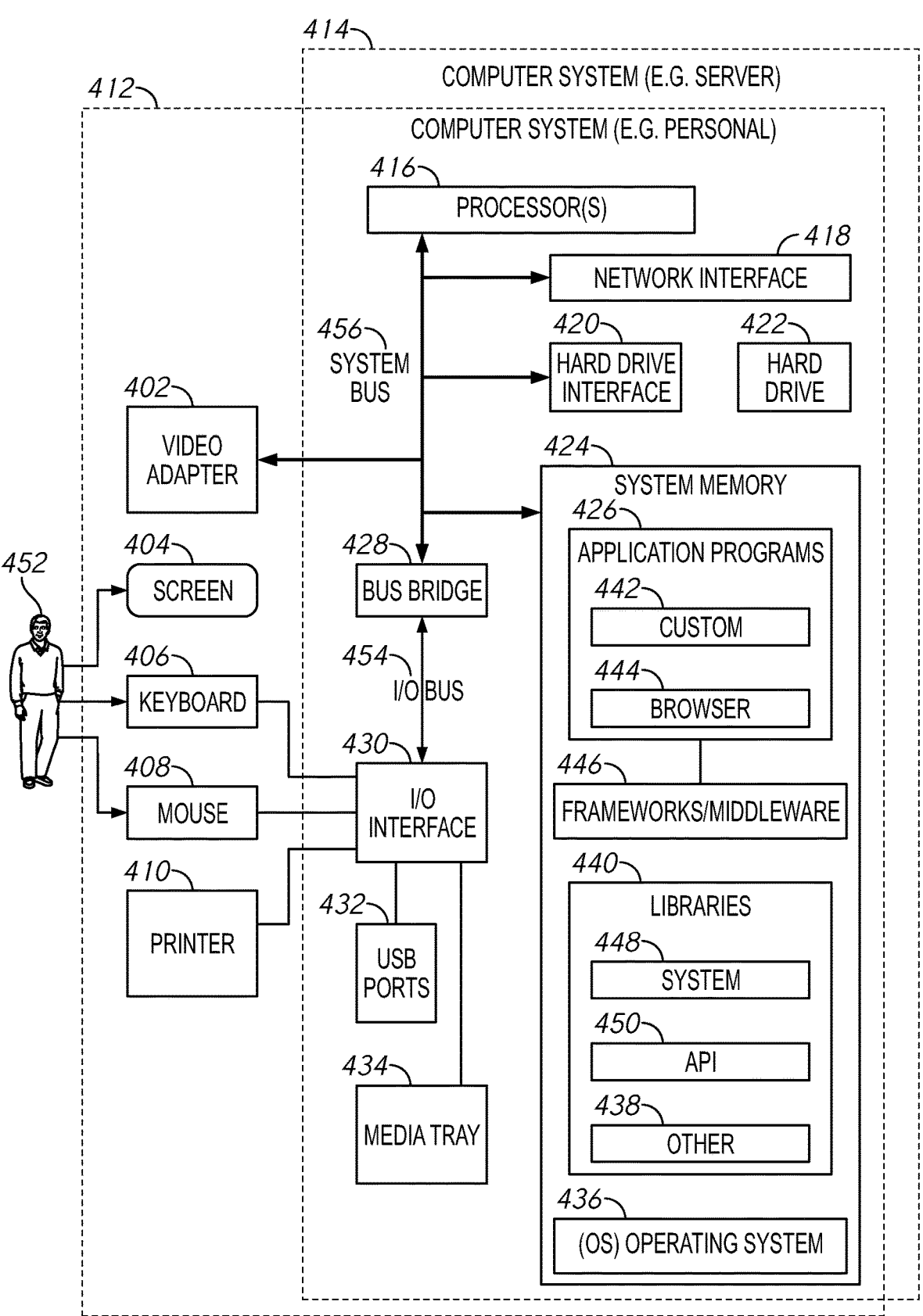
FIG. 4 shows details for a sample computer system computer system 414 and for a sample computer system 412 arranged in accordance with examples described herein.

FIG. 4 shows details for a sample computer system computer system 414 and for a sample computer system 412. The computer system 414 may be a server, while the computer system 412 may be a personal device, such as a personal computer, a desktop computer, a personal computing device such as a laptop computer, a tablet computer, a mobile phone, and so on. Either type may be used for the computer system 148 and 140 of FIG. 1, and/or a computer system that is part of OPF 136. Similarly, either type may be used for the server computer 206 of FIG. 2 in various examples. Generally, any of the computer systems shown in FIG. 4 may be used to implement any computing systems described herein.

The computer system 414 and the computer system 412 have similarities, which FIG. 4 exploits for purposes of economy in this document. It will be understood, however, that a component in the computer system 414 may be implemented differently than the same component in the computer system 412. For instance, a memory in a server may be larger than a memory in a personal computer, and so on. Similarly, custom application programs 442 that implement embodiments may be different, and so on.

The computer system 414 includes one or more processor(s) 416. The processor(s) 416 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processor(s) 416 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 414, or the computer system 412, are not intended to be exhaustive. Rather, they are representative, for highlighting essential components that can be used with embodiments.

The computer system 414 also includes a system bus 456 that is coupled to the processor(s) 416. The system bus 456 can be used by the processor(s) 416 to control and/or communicate with other components of the computer system 414.

The computer system 414 additionally includes a network interface 418 that is coupled to system bus 456. Network interface 418 can be used to access a communications network, such as the network 134. Network interface 418 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 414 also includes various memory components. These memory components include memory components shown separately in the computer system 414, plus cache memory within the processor(s) 416. Accordingly, these memory components are examples of non-transitory machine-readable media. The memory components shown separately in the computer system 414 are variously coupled, directly or indirectly, with the processor(s) 416. The coupling in this example is via the system bus 456.

Instructions for performing any of the methods or functions described in this document may be stored, completely or partially, within the memory components of the computer system 414, etc. Therefore, one or more of these non-transitory computer-readable media can be configured to store instructions which, when executed by one or more processor(s) 416 of a host computer system such as the computer system 414 or the computer system 412, can be designed to or programmed to cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 414 include a non-volatile hard drive 422. The computer system 414 further includes a hard drive interface 420 that is coupled to the hard drive 422 and to the system bus 456.

The memory components of the computer system 414 include a system memory 424. The system memory 424 includes volatile memory including, but not limited to, cache memory, registers and buffers. In embodiments, data from the hard drive 422 populates registers of the volatile memory of the system memory 424.

In some embodiments, the system memory 424 has a software architecture that uses a stack of layers, with each layer providing a particular functionality. In this example the layers include, starting from the bottom, a (OS) Operating System 436, libraries 440, frameworks/middleware 446 and application programs 426, which are also known more simply as applications 426. Other software architectures may include less, more or different layers. For example, a presentation layer may also be included. For another example, some mobile or special purpose operating systems may not provide a frameworks/middleware 446.

The (OS) Operating System 436 may manage hardware resources and provide common services. The libraries 440 provide a common infrastructure that is used by the applications 426 and/or other components and/or layers. The libraries 440 provide functionality that allows other software components to perform tasks more easily than if they interfaced directly with the specific underlying functionality of the (OS) Operating System 436. The libraries 440 may include system libraries 448, such as a C standard library. The system libraries 448 may provide functions such as memory allocation functions, string manipulation functions, mathematical functions, and the like.

In addition, the libraries 440 may include API libraries 450 and other libraries 438. The API libraries 450 may include media libraries, such as libraries to support presentation and manipulation of various media formats such as MPREG4, H.264, MP3, AAC, AMR, JPG, and PNG. The API libraries 450 may also include graphics libraries, for instance an OpenGL framework that may be used to render 2D and 3D in a graphic content on the screen 404. The API libraries 450 may further include database libraries, for instance SQLite, which may support various relational database functions. The API libraries 450 may additionally include web libraries, for instance WebKit, which may support web browsing functionality, and also libraries for applications 426.

The frameworks/middleware 446 may provide a higher-level common infrastructure that may be used by the applications 426 and/or other software components/modules. For example, the frameworks/middleware 446 may provide various Graphic User Interface (GUI) functions, high-level resource management, high-level location services, and so forth. The frameworks/middleware 446 may provide a broad spectrum of other APIs that may be used by the applications 426 and/or other software components/modules, some of which may be specific to the (OS) Operating System 436 or to a platform.

The application programs 426 are also known more simply as applications and apps. One such app is a browser 444, which is a software that can permit the user 452 to access other devices in the internet, for example while using a Graphic User Interface (GUI). The browser 444 includes program modules and instructions that enable the computer system 414 to exchange network messages with a network, for example using Hypertext Transfer Protocol (HTTP) messaging.

The application programs 426 may include one or more custom application programs 442, made according to embodiments. These can be made so as to cause their host computer to perform operations according to embodiments. Of course, when implemented by software, operations according to embodiments may be implemented much faster than may be implemented by a human mind; for example, tens or hundreds of such operations may be performed per second according to embodiments, which is much faster than a human mind can do.

Other such applications 426 may include a contacts application, a book reader application, a location application, a media application, a messaging application, and so on. Applications 426 may be developed using the ANDROID™ or IOS™ Software Development Kit (SDK) by an entity other than the vendor of the particular platform, and may be mobile software running on a mobile operating system. The applications 426 may use built-in functions of the (OS) Operating System 436, of the libraries 440, and of the frameworks/middleware 446 to create user interfaces for the user 452 to interact with.

The computer system 414 moreover includes a bus bridge 428 coupled to the system bus 456. The computer system 414 furthermore includes an input/output I/O bus 454 coupled to the bus bridge 428. The computer system 414 also includes an I/O interface 430 coupled to the I/O bus 454.

For being accessed, the computer system 414 also includes one or more Universal Serial Bus (USB) ports 432. These can be coupled to the I/O interface 430. The computer system 414 further includes a media tray 434, which may include storage devices such as CD-ROM drives, multimedia interfaces, and so on.

The computer system 412 may include many components similar to those of the computer system 414, as seen in FIG. 4. In addition, a number of the application programs may be more suitable for the computer system 412 than for the computer system 414.

The computer system 412 further includes peripheral input/output (I/O) devices for being accessed by a user more routinely. As such, the computer system 412 includes a screen 404 and a video adapter 402 to drive and/or support the screen 404. The video adapter 402 is coupled to the system bus 456.

The computer system 412 also includes a keyboard 406, a mouse 408, and a printer 410. In this example, the keyboard 406, the mouse 408, and the printer 410 are directly coupled to the I/O interface 430. Sometimes this coupling is via the USB ports 432.

In this context, "machine-readable medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium includes one or more processor(s) 416.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Figure 5:
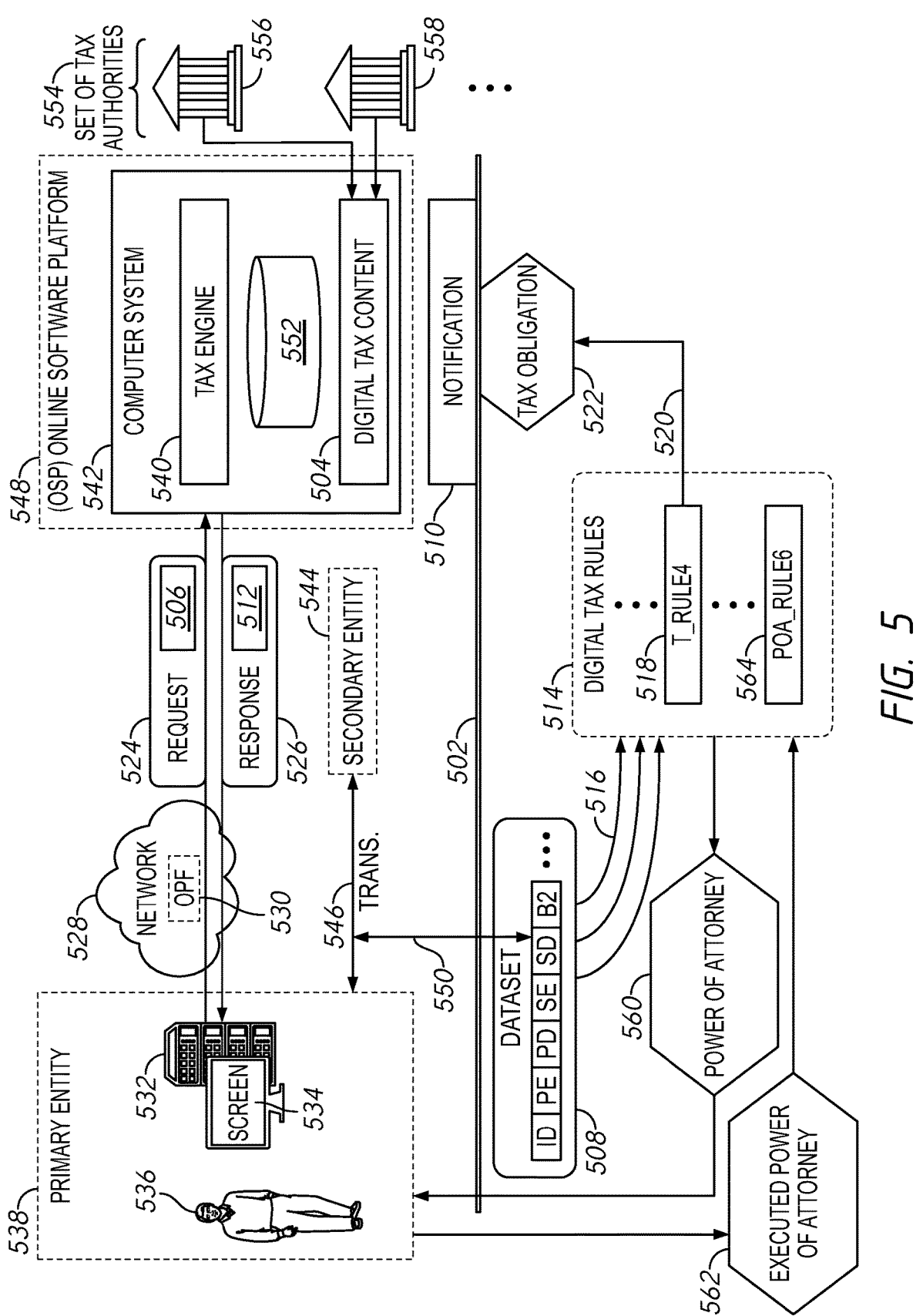
FIG. 5 is a diagram for an operational example where a buy-sell transaction 546 is a use case of the relationship instance 152 arranged in accordance with examples described herein.

FIG. 5 is a diagram for an operational example where a buy-sell transaction 546 is a use case of the relationship instance 152. The transaction 546 is conducted between a primary entity 538, which is a seller, and a secondary entity 544, which is a buyer. A tax obligation 522 often arises from the transaction 546—in particular a sale and/or use tax must be paid by either the primary entity 538 or the secondary entity 544. A computation of the tax obligation 522 is a use case of producing the resource 126.

It will be recognized that aspects of FIG. 5 have similarities with aspects of FIG. 1. Portions of such aspects may be implemented as described for analogous aspects of FIG. 1. In particular, a thick horizontal line 502 separates FIG. 5, although not completely or rigorously, into a top portion and a bottom portion. Above the line 502 are shown elements with emphasis mostly on entities, components, their relationships, and their interactions, while below the line 502 are shown elements with emphasis mostly on processing of data that takes place often within one or more of the components that are above the line 502.

Above the line 502, a computer system 542 is shown, which is used to help customers, such as a user 536, with tax compliance. For instance, the user 536 may log into the computer system 542 by using credentials, such as a user name, a password, a token, and so on. Further in this example, the computer system 542 is part of a (OSP) online software platform 548 that is implemented as a Software as a Service (SaaS) provider, for being accessed by the user 536 online. As such, the (OSP) online software platform 548 can be an online service provider for clients. Alternately, the functionality of the computer system 542 may be provided locally to a user.

The user 536 may be standalone. The user 536 may use a computer system 532 that has a screen 534. In embodiments, the user 536 and the computer system 532 are considered part of the primary entity 538, which is also known as entity 538. The primary entity 538 can be a business, such as a seller of items, a reseller, a buyer, a service business, and so on. In such instances, the user 536 can be an employee, a contractor, or otherwise an agent of the entity 538. In use cases the entity 538 is a seller, the secondary entity 544 is a buyer, and together they are performing the buy-sell transaction 546. The buy-sell transaction 546 may involve an operation, such as an exchange of data to form an agreement. This operation can be performed in person, or over the network 134, etc. In such cases the entity 538 can even be an online seller, but that is not necessary. The transaction 546 will have data that is known to the entity 538, similarly with what was described by the relationship instance 152 of FIG. 1.

In a number of instances, the user 536 and/or the entity 538 use software applications to manage their business activities, such as sales, resource management, production, inventory management, delivery, billing, and so on. The user 536 and/or the entity 538 may further use accounting applications to manage purchase orders, sales invoices, refunds, payroll, accounts payable, accounts receivable, and so on. Such software applications, and more, may be used locally by the user 536, or from an Online Processing Facility (OPF) 530 that has been engaged for this purpose by the user 536 and/or the entity 538. In such use cases, the OPF 530 can be a Mobile Payments system, a Point Of Sale (POS) system, an Accounting application, an Enterprise Resource Planning (ERP) provider, an e-commerce provider, an electronic marketplace, a Customer Relationship Management (CRM) system, and so on.

Businesses have tax obligations to various tax authorities of respective tax jurisdictions. These tax obligations are challenging. A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a group of countries, of a single country, of a state, of a county, of a municipality, of a city, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if the seller cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome for the amounts of money involved. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes can be considered trust-fund taxes, meaning that the management of a company may be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location, meaning according to the rules of the tax authority of the seller, or from the buyer's location, meaning according to the rules of the tax authority of the buyer.

Second, the various tax authorities assess different, i.e., non-uniform, percentage rates of the sales price as sales tax, for the purchase and sale of items that involve their various tax jurisdictions. These tax jurisdictions include various states, counties, cities, municipalities, special taxing jurisdictions, and so on. As the United States switched, largely but not completely, from primarily origin-based sales tax to destination-based tax, the number of tax jurisdictions rapidly multiplied, and the incentives for local governments to implement new and varied tax rules and ever smaller jurisdictions multiplied. As such, there are over 10,000 different tax jurisdictions in the US, with many partially overlapping. Their sizes vary from as large as many square miles to as small as a single building. In parallel, tens of thousands of tax rules and tax rates have been developed.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is, and/or what the purchase is for. For example, certain entities are exempt from paying sales tax on their purchases, as long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid. And, certificates of exemption may expire after some time, and may need to be renewed or reissued.

Fifth, it can be hard to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

The economic nexus mentioned above can be even more complicated. Even where a seller might not have reached any of the thresholds for economic nexus, a number of states are promulgating marketplace facilitator laws that sometimes use such thresholds. According to such laws, intermediaries that are characterized as marketplace facilitators per laws of the state may have an obligation, instead of the seller, to collect sales tax on behalf of their sellers, and remit it to the state. The situation becomes even more complex when a seller sells directly to a state, and also via such an intermediary.

To help with such complex determinations, the computer system 542 may be specialized for tax compliance. The computer system 542 may have one or more processors and memory, for example as was described for the computer system 148 of FIG. 1. The computer system 542 thus implements a tax engine 540 to make the determinations of tax obligations. The tax engine 540 can be as described for the service engine 128. The tax engine 540 may be used, for example, to prepare or file tax returns.

In part due to some of the complexities outlined herein, and also for other reasons in some examples, it may be helpful for the computer system 542 to communicate with one or more jurisdictions and/or authorities regarding the tax obligations of the user. For example, an owner, operator, employee, or other representative of a company or entity that operates the computer system 542 may desire to speak with a representative of a taxing authority on behalf of the user. In order for a taxing authority to accept such a communication on behalf of the user, it may be necessary to obtain a power of attorney from the user to allow the computer system 542 to submit information on behalf of the user and/or for an entity associated with the computer system 542 to communicate with the taxing authority on behalf of the user. Accordingly, the computer system 542 may be specialized to automatically generate powers of attorney that may be useful in aiding users with tax compliance. The powers of attorney may be generated automatically at a time of initial onboarding of a client (e.g., a user) to an OSP and/or may be dynamically generated as users implicate additional filing jurisdictions or user attributes change.

The computer system 542 may further store locally entity data, i.e. data of user 536 and/or of entity 538, either of which/whom may be a customer, and/or a seller or a buyer in a sales transaction. The entity data may include profile data of the customer, and transaction data from which a determination of a tax obligation is desired. In the online implementation of FIG. 5, the (OSP) online software platform 548 has a database 552 for storing the entity data. This entity data may be inputted by the user 536, and/or caused to be downloaded or uploaded by the user 536 from the computer system 532 or from the OPF 530, or extracted from the computer system 532 or from OPF 530, and so on. In other implementations, a simpler memory configuration may suffice for storing the entity data.

A digital tax content 504 is further implemented within the (OSP) online software platform 548. The digital tax content 504 can be a utility that stores digital tax rules 514 for use by the tax engine 540. As part of managing the digital tax content 504, there may be continuous updates of the digital tax rules, by inputs gleaned from a set 554 of different tax authorities 556, 558, . . . . Updating may be performed by humans, or by computers, and so on. As mentioned above, the number of the different tax authorities in the set 554 may be very large. In such use cases, tax jurisdictions such as a country, a state, a city, a municipality, etc. correspond to domains discussed earlier in this document. The digital tax content 504 may in some examples include specifics regarding the format or content of powers of attorney used by the set of tax authorities 554, 558, and/or others.

For a specific determination of a tax obligation, the computer system 542 may receive one or more datasets. A sample received dataset 508 is shown just below line 502. The dataset 508 has values that can also be called dataset values, and be otherwise examples of what was described for the dataset values of the dataset 110 of FIG. 1. In this example, the computer system 532 transmits a request 524 that includes a payload 506, and the dataset 508 is received by the computer system 542 parsing the received payload 506. In this example the single payload 506 encodes the entire dataset 508, but that is not required, as mentioned above.

In this example, the dataset 508 has been received because it is desired to determine any tax obligations arising from the buy-sell transaction 546. As such, the sample received dataset 508 has values that characterize attributes of the buy-sell transaction 546, as indicated by a correspondence arrow 550. Accordingly, in this example the sample received dataset 508 has a value ID for an identity of the dataset 508 and/or the transaction 546. The dataset 508 also has a value PE for the name of the primary entity 538 or the user 536, which can be the seller making sales transactions, some perhaps online. The dataset 508 further has an optional value PD for relevant data of the primary entity 538 or the user 536, such as an address, place(s) of business, prior nexus determinations with various tax jurisdictions, and so on. The value PD is optional because it may be possible to look it up from the value PE. The dataset 508 also has a value SE for the name of the secondary entity 544, which can be the buyer. The dataset 508 further has a value SD for relevant data of the secondary entity 544, entity-driven exemption status, and so on. In some instances, the value SD can be optional, similarly with the value PD. The dataset 508 has a numerical value B2 for the sale price of the item sold. The dataset 508 may further have additional dataset values, as indicated by the dot-dot-dot in the right side of the dataset 508. These values may characterize further attributes, such as what item was sold, for example by a Stock Keeping Unit (SKU), how many units of the item were sold in the transaction 546, a date and possibly also time of the transaction 546, and so on.

The digital tax rules 514 are digital in that they are implemented for use by software, similarly with these rules 118. The digital tax rules 514 can be created so as to accommodate legal tax rules that the set 554 of different tax authorities 556, 558 . . . promulgate to apply within the boundaries of their tax jurisdictions. In the example of this diagram, only one sample digital tax rule is shown explicitly, namely rule T_RULE4 518. In this diagram, all other such rules are indicated by the vertical dot-dot-dots.

Then the computer system 542 may select a certain one of the digital tax rules 514. In this example, the rule T_RULE4 518 is thus selected. The selection of this particular rule is indicated also by the fact that an arrow 520 begins from that rule. The arrow 520 is similar to the arrow 124.

The computer system 542 may thus select the certain rule T_RULE4 518 responsive to one or more of the dataset values of the dataset 508. The impact of the dataset 508 in the selection is indicated by at least some of the arrows 516, similarly with the arrows 120. For example, it can be recognized that a condition of the digital tax rule T_RULE4 518 is met by one or more of the values of the dataset 508. For instance, it can be further determined that, at the time of the sale, the buyer 546 is located within the boundaries of a tax jurisdiction, that the seller 538 has nexus with that tax jurisdiction, and that there is no tax holiday.

As such, the computer system 542 may produce the tax obligation 522, which is akin to producing the resource 126 of FIG. 1. The tax obligation 422 can be produced by the computer system 542 applying the certain digital tax rule T_RULE4 518, as indicated by the arrow 520. The impact of the dataset 508 in producing the tax obligation 522 is indicated by at least one of the arrows 516. In this example, the identified certain digital tax rule T_RULE4 518 may specify that a sales tax is due, the amount is to be determined by a multiplication of the sale price of the value B2 by a specific rate, the tax return form that needs to be prepared and filed, a date by which it needs to be filed, and so on.

The computer system 542 may then cause a notification 510 to be transmitted. In the example of FIG. 5, the notification 510 is caused to be transmitted by the computer system 542 as an answer to the received dataset 508. The notification 510 can be about an aspect of the tax obligation 522, similarly with the notification 112 of FIG. 1. For instance, the notification 510 may inform that the tax obligation 522 has been determined, where it can be found, what it is, or at least a portion or a statistic of its content, and so on.

The notification 510 can be transmitted to one of an output device and another device that can be the remote device, from which the dataset 508 was received. The output device may be the screen of a local user or a remote user. The notification 510 may thus cause a desired image to appear on the screen, such as within a Graphical User Interface (GUI) and so on. The other device may be a remote device, as in this example. In particular, the computer system 542 causes the notification 510 to be communicated by being encoded as a payload 512, which is carried by a response 526. The response 526 may be transmitted via the network 134 responsive to the received request 524. The response 526 may be transmitted to the computer system 532, or to the OPF 530, and so on. As such, the other device can be the computer system 532, or a device of the OPF 530, or the screen 534 of the user 536, and so on. In this example the single payload 512 encodes the entire notification 510, but that is not required, similarly with what is written above about encoding datasets in payloads. Of course, along with the aspect of the tax obligation 522, it is advantageous to embed in the payload 512 the ID value and/or one or more values of the dataset 508. This will help the recipient correlate the response 526 that they receive to their request 524, and therefore match the received aspect of the tax obligation 522 as the answer to the transmitted dataset 508.

The digital tax rules 514 can be implemented or organized in different ways. For example, these digital tax rules 514 may have applicability conditions that relate to geographical boundaries, effective dates with possible temporary exceptions, item classification into categories, differently-treated parties, and so on, for determining where and when a certain digital tax rule is to be selected and applied, to determine the tax obligation 522. These conditions may be expressed as logical conditions with ranges, dates, other data, and so on. Values of the dataset 508 can be iteratively tested against these logical conditions according to arrows 516. In such cases, the applicable tax rules may indicate how to compute one or more tax obligations, such as to indicate different types of taxes that are due, rules, rates, exemption requirements, reporting requirements, remittance requirements, the actual amounts of tax obligations, etc.

As with the digital resource rules 118, the digital tax rules 514 may also be complex. While a certain one of them is eventually selected and applied to determine the tax obligation, more than one of them may be used for selecting that certain one.

In some examples, it may be helpful for the user 536 to execute one or more powers of attorney to provide the computer system 542 and/or (OSP) online software platform 548, or employees or other representatives thereof, to communicate with tax authorities on behalf of the user. Accordingly, the digital tax rules 514 may include one or more rules relating to powers of attorney used by tax authorities. For example, the digital tax rules 514 may include template power of attorney documents and/or an identification of attributes of a user for inclusion in a power of attorney. The computer system 542 may select one or more digital tax rules 514 pertaining to powers of attorney, such as POA_rule6 564. The rule selected may be based on the request 524 sent by the user 536. For example, information in the dataset 508 may be used to identify one or more taxing authorities for which a power of attorney may be desirable. For example, the identity of the primary entity 538 or the user 536, which can be the seller making sales transactions may be used to identify relevant taxing authorities (e.g., taxing authorities that the user 536 is subject to and/or has paid tax liabilities to in the past). In other examples, identification of the primary entity 538 or the user 536, such as an address, place(s) of business, prior nexus determinations with various tax jurisdictions, may be used to identify taxing authorities for which a power of attorney may be desired. In some examples, the identity of the secondary entity 544, which can be the buyer, may be used to identify taxing authorities for which it may be desirable to obtain a power of attorney. Other information in the dataset may additionally or instead be used to determine a taxing authority for which a power of attorney may be desired.

The computer system 542 may generate a power of attorney 560 in accordance with a digital rule relating to a power of attorney, such as POA_rule6 564. The power of attorney 560 may be generated using a template for a power of attorney for the taxing authority, and combining values of attributes associated with the user 536 that are used in the power of attorney and specified in the digital rules for power of attorney generation. The computer system 542 may access values for the used attributes, and combine them with the template to generate the power of attorney 560.

Advantageously, the power of attorney 560 may be generated, for example, at or around a time the user 536 registers with the computer system 542 and/or (OSP) online software platform 548. The power of attorney 560 may be generated at or around a time the user 536 makes a request 524 for a service from the (OSP) online software platform 548. Accordingly, the power of attorney 560 may be generated prior to a need to use the power of attorney 560. This may allow a user to promptly attend to execution of power of attorney documents such that they may be stored and utilized when the computer system 542, (OSP) online software platform 548, or an entity associated with those systems has a desire or need to communicate with a tax authority on behalf of the user (e.g., when an error or complication in a tax calculation or other tax submission or return is encountered). This may allow the computer system 542 and/or (OSP) online software platform 548 to be more efficient and responsive to users, because they are able to utilize stored power of attorney documents at a time a complication is encountered, without a need to delay to obtain the power of attorney at the later time.

The power of attorney 560 may be transmitted to the user 536 (e.g., to the computer system 532) for execution by the user 536. The user 536 may view the power of attorney on the screen 534, and may execute the power of attorney by, for example, electronically signing the power of attorney using one or more input devices to the computer system 532. The executed power of attorney 562 may be transmitted back to the computer system 542 and stored. The executed power of attorney 562 may be provided to one or more taxing authorities such as 556 and/or 558 when a communication is to be made on behalf of the user 536.

In this manner, the power of attorney 560 and executed power of attorney 562 may be generated and/or used in an analogous manner to that described with reference to FIG. 1 and the authorization credential 158 and verified authorization credential 160.

FIG. 6 is a flowchart of an example method arranged in accordance with examples described herein. The method 600 includes block 602, "client registers for reporting service with OSP." Block 604, "computing system determines jurisdictions impact" may follow block 602. Block 606, "computing system determines POA requirements based on rules and POA requirements database" may follow block 604. Block 608, "nexus and tax calculation only?" may follow block 606. If a user has only requested nexus or tax calculation, block 610 "return POAs which are needed but don't require OSP to sign or be listed" may follow block 608. If a user may be represented by the OSP (e.g., for something in addition to the nexus and tax calculation, block 612 "return POAs which need to be signed where OSP will represent the client" may follow block 608. Block 614, "computing system determines first and second party for the POA" may follow block 612. Block 616, "computing system sends back master POA to client" may follow block 614. Block 618, "client sends back signed POA" may follow block 616. Block 620 "computing system stores the signed POA and submits it via POA submitter to state (and local) offices" may follow block 618.

The method 600 is an example of the method 300 in a specific context of powers of attorney being generated. The method 600 may be implemented by one or more computing systems described herein, such as those depicted and described with reference to FIG. 1 and/or FIG. 2 and/or FIG. 5. The blocks shown in FIG. 6 are exemplary only. Additional, fewer, and/or different blocks may be used in other examples. The method 600 may be implemented wholly and/or partially using software. For example, one or more non-transitory computer readable media may be provided encoded with instructions which, when executed by one or more processors, cause the one or more processors to perform some or all of the actions shown in method 600.

Block 602 recites "client registers for reporting service with OSP." The block 602 may be implemented, for example, by computer system 148 of FIG. 1 and/or server computer 206 of FIG. 2. The computing system may receive a request from a user, in an analogous manner as described with method 300 of FIG. 3. The request may include a request to engage one or more services offered by the computing system, such as a reporting service which may be used to report tax computations or other tax obligations, or tax returns. For example, OSPs or computing systems described herein may be used to prepare and/or file tax returns on behalf of users in particular jurisdictions where the user has reporting obligations.

Block 604 recites "computing system determines jurisdictions implicated." The computing system may identify one or more jurisdictions (e.g., taxing authorities) implicated by the request in block 602. For example, the computing system may identify a jurisdiction in which the user providing the request is located and/or does business. The identification may be based on information in the request and/or information accessible to the computing system (e.g., accessed in the attribute data database 228 or other database accessible to the computing system). For example, block 604 may identify jurisdictions in which a client has requested that the OSP prepare and/or file tax returns. In some examples, block 604 may identify a jurisdiction in which the user resides.

While a single jurisdiction is referenced in block 604, in some examples, multiple jurisdictions may be implicated by a request, or implicated by multiple requests, may be identified in block 604. For example, a user may provide multiple requests, each of which implicate one or more domains. Multiple domains implicated by one or more requests provided by a user may be identified in block 604 in some examples.

Block 606 recites "computing system determines POA requirements based on rules and POA requirements database." Block 604 may be implemented, for example, by computer system 148 of FIG. 1 and/or computer system 542 of FIG. 5. The computer system 542 may access digital tax rules 514, such as POA_rule6 564. Block 606 may be implemented, for example, by server computer 206 of FIG. 2 which may access authorization rule database 208. For example, the digital rule evaluator 210 and/or forms generator 218 may access the authorization rule database 208 in block 606. Accordingly, in block 606 digital rules for the jurisdiction(s) identified in block 604 may be accessed. The rules may specify one or more attributes for inclusion in a power of attorney for the jurisdiction.

Block 608 recites "nexus and tax calculation only?". Accordingly, in block 608 a computing system may determine whether, based on one or more requests received from a user, the user is only requesting services that do not, or are not likely to, benefit from the use of a power of attorney that allows the OSP or other entity to communicate on behalf of the user. For example, in block 608 the computing system may determine whether a particular service requested pertains only to a nexus and tax calculation.

When only a nexus or tax calculation is requested, such as for informational or other purposes that may not involve a submission to a tax authority, the computing system (e.g., the OSP), may be unlikely to represent the user to a taxing authority and the method 600 may proceed to block 610. In block 610 powers of attorney may be returned which are needed or useful but which do not involve the OSP. Block 610 may be implemented by computer system 148 of FIG. 1 and/or server computer 206 of FIG. 2 and/or computer system 542 of FIG. 5 in some examples. For example, the forms retriever 220 and/or forms generator 218 of FIG. 2 may be used to implement block 610. The powers of attorney returned in block 610 may be provided to the user, such as through the front end 214 of FIG. 2.

In some examples, block 608 and/or block 610 may be optional. For example, the computing system may not check or otherwise determine whether a user is likely to be represented by the OSP before proceeding to block 612 in some examples.

When a user will be represented by the computing system (e.g., the OSP), or will be likely to be represented by the computing system (or entity associated with the computing system), the method 600 may proceed to block 612. For example, when a user has requested that the OSP prepare and/or file one or more tax returns on its behalf, the method 600 may proceed to block 612. In block 612 powers of attorney may be returned for the computing system (e.g., the OSP) to represent the user. Block 612 may be implemented by computer system 148 of FIG. 1 and/or server computer 206 of FIG. 2 and/or computer system 542 of FIG. 5 in some examples. For example, the forms retriever 220 and/or forms generator 218 of FIG. 2 may be used to implement block 612. Accordingly, in block 612 one or more power of attorney templates may be retrieved, e.g., from authorization rule database 208 of FIG. 2.

In block 614, the computing system may determine values of attributes for use in the power of attorney. For example, the attributes for use may be specified by the one or more rules accessed in block 606. In block 612, values for the attributes may be determined. For example, the attribute data database 228 of FIG. 2 may be accessed to obtain the values for the attributes. In the example of FIG. 6, the attributes may include the identity of the first and second parties where the first party (e.g., the user) may execute a power of attorney in favor of the second party (e.g., the OSP). Block 614 may be implemented by the computer system 148 of FIG. 1 and/or server computer 206 of FIG. 2 and/or computer system 542 of FIG. 5 in some examples. For example, the forms generator 218 of FIG. 2 may access the attribute data database 228.

The values of the attributes accessed may be combined to generate a power of attorney in block 616. The power of attorney may be from the first party (e.g., the user) to the second party (e.g., the OSP). For example, the values of the attributes may be inserted into or otherwise incorporated into a template for the power of attorney. The forms generator 218 of FIG. 2 may be utilized to do the combining, for example. In some examples, the user of the OSP may not be the tax payor. In some examples, another service provider (e.g., an accountant) may be the user of the OSP on behalf of a client of the service provider. Accordingly, in block 614, the computing system may determine that the power of attorney may be for the client to execute in favor of the service provider. For example, the client may be the first entity that will execute a power of attorney in favor of an accountant as the second party. In this manner, the OSP may be leveraged by the service provider (e.g., an accountant), but the OSP itself may not receive a power of attorney.

In block 616, the computing system may send a power of attorney to the client (e.g., the user). In some examples, a master power of attorney may be sent. The master power of attorney may refer to a power of attorney using electronic signature requirements that can be leveraged for automated population across multiple powers of attorney. The power of attorney and/or master power of attorney may be populated with values of attributes used or required by a particular taxing authority for use in a power of attorney. The power of attorney may be transmitted to the user, such as by transmitting the power of attorney to a computing system used or accessed by the user. The power of attorney may be transmitted by email and/or in another manner. The power of attorney may be displayed on a computing system used or accessed by the user. The computing system used or accessed by the user may be a mobile device in some examples. The computer system 148 of FIG. 1 and/or the server computer 206 of FIG. 2 and/or the computer system 542 of FIG. 5 may be used to implement block 616. For example, the computer system 542 may transmit the power of attorney 560 to the computer system 532 in block 616. In some examples, the server computer 206 of FIG. 2 may transmit the power of attorney to the user using front end 214. In some examples, the power of attorney may be stored (e.g., in authorization credential database 222 of FIG. 2) and accessed by the user responsive to a connection request by the user.

In block 318, the client may return an executed power of attorney. To provide an executed power of attorney, the user may sign the power of attorney. In some examples, the master power of attorney may be displayed using a computing system accessed by the user. The user may input the signature to the computing system. The user may return the executed power of attorney to the OSP. For example, the computer system 532 of FIG. 5 may send the executed power of attorney 562 to the computer system 542. In some examples, the user 202 may utilize a computing system to provide an executed power of attorney to the server computer 206. In some examples, the computing system may verify that the power of attorney has been properly executed—e.g., by verifying that a signature has been provided in an appropriate location, by verifying that the signature is viewable and/or readable and/or does not obscure other text on the power of attorney, and/or by verifying that the signature matches a stored representation of a signature of the user.

In block 620, the computing system may store the signed power of attorney. For example, the server computer 206 of FIG. 2 may store the verified authorization credential in authorization credential database 222. The signed power of attorney may be utilized in a variety of ways. In some examples, the executed power of attorney may be submitted to a taxing authority, such as one or more state (and/or local) offices. For example, the computer system 542 of FIG. 5 may provide the executed power of attorney 562 to a computing system associated with one or more of the set of tax authorities 554. In another example, the server computer 206 of FIG. 2 may provide the executed power of attorney to a computing system associated with the jurisdiction, e.g., domain 232. Once the computing system associated with the tax authority has received the executed power of attorney, it may cause the taxing authority, or a computing system of the taxing authority, to accept data or communications on behalf of the user which are made by the OSP or other entity associated with the computing system which generated the verified authorization credential.

Figure 7:
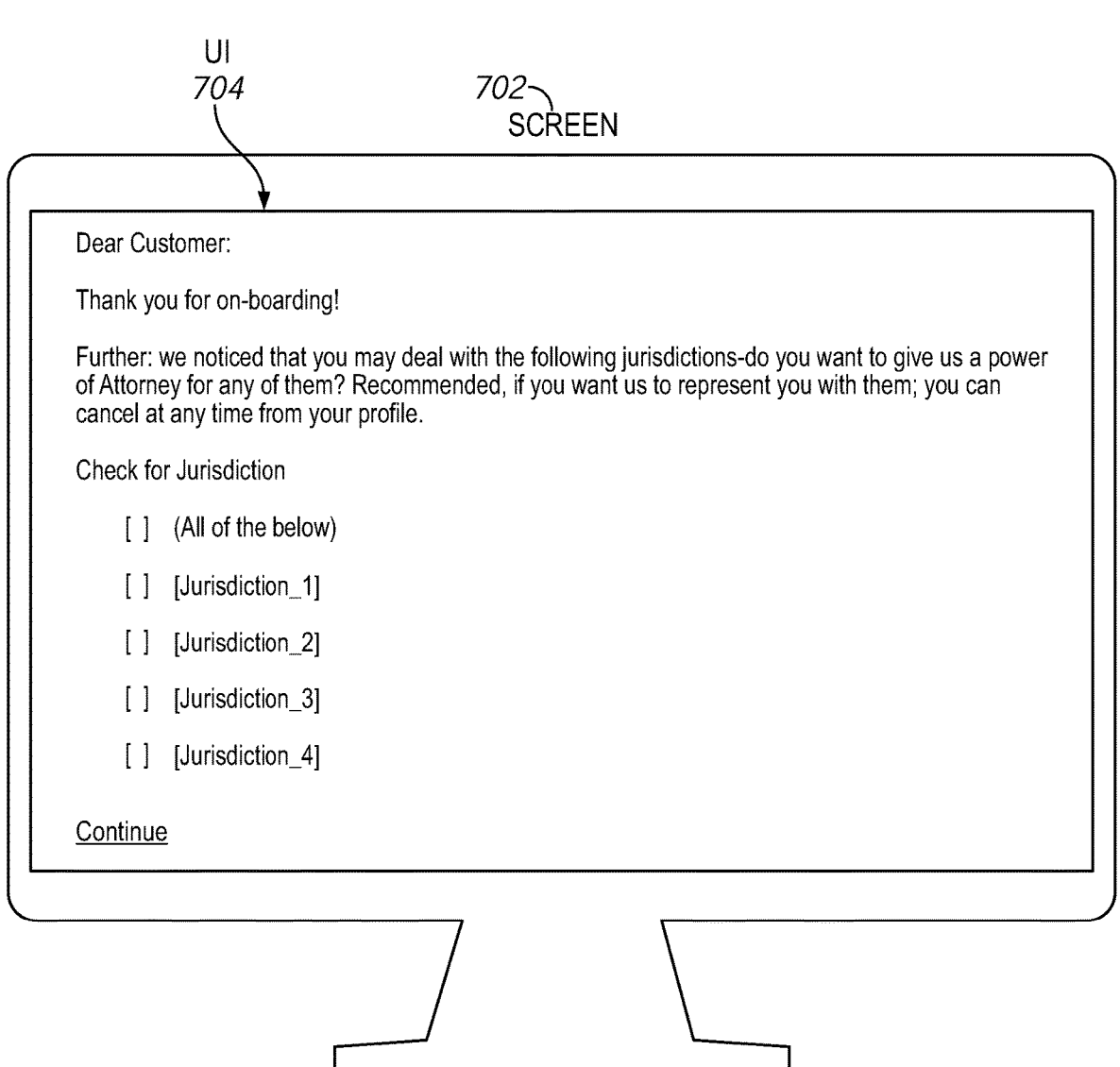
FIG. 7 is a sample view of a User Interface (UI) 704, shown on a screen 702 arranged in accordance with examples described herein.

FIG. 7 is a sample view of a User Interface (UI) 704, shown on a screen 702. The UI 704 shows an example of a view a user may see when registering with an OSP described herein. For example, the screen 702 may be the screen 140 of FIG. 1, the screen 534 of FIG. 5 and/or a screen of a computing system used by user 452 of FIG. 4. The view shown in FIG. 7 may occur, for example, at block 602 of method 600 of FIG. 6.

A computing system, such as a computing system of an OSP, may have identified multiple jurisdictions implicated by the user and/or by one or more requests of the user. Accordingly, the computing system may prompt the user to provide one or more powers of attorney in those jurisdictions.

In the example of FIG. 7, the user may select to provide power of attorney in Jurisdiction_1, Jurisdiction_2, Jurisdiction_3, Jurisdiction_4, or all of the below jurisdictions. The user may utilize one or more input devices to make a selection (e.g., touch screen, stylus, spoken command, mouse, keyboard). The communication depicted in FIG. 7 may be sent to the computing system having the screen 702 using email, or by a connector, or an API or other communication mechanism.

When the computing system, such as computer system 148 of FIG. 1, server computer 206 of FIG. 2, and/or computer system 542 of FIG. 5 receives the user selection of jurisdictions in which to prepare powers of attorney, the receiving computing system may prepare the powers of attorney in accordance with examples described herein.

FIG. 8 is a sample view of a User Interface (UI) 804, shown on a screen 802. The UI 804 shows the presentation of power of attorney documents for execution by a user. For example, the screen 802 may be the screen 140 of FIG. 1, the screen 534 of FIG. 5 and/or a screen of a computing system used by user 452 of FIG. 4. The view shown in FIG. 8 may occur, for example, at block 616 of method 600 of FIG. 6.

In the example of FIG. 8, the user is provided with power of attorney documents for Jurisdiction_1, Jurisdiction_2, Jurisdiction_3, and Jurisdiction_4. The user has an option to view each document and/or sign each document by selecting the appropriate links in the user interface. A link is also provided in UI 804 to sign all available power of attorney documents at once (e.g., in a serial manner). The links to view the document may bring the document up in a viewer, such as ADOBE ACROBAT, MICROSOFT WORD, or some other document viewing application. The links to sign the documents may, for example, launch a digital signature application and display the power of attorney documents for signature to the user, such as using DOCUSIGN, ADOBE SIGN, or other electronic signature application.

The communication depicted in FIG. 8 may be sent to the computing system having the screen 702 using email, or by a connector, or an API or other communication mechanism.

Figure 9:
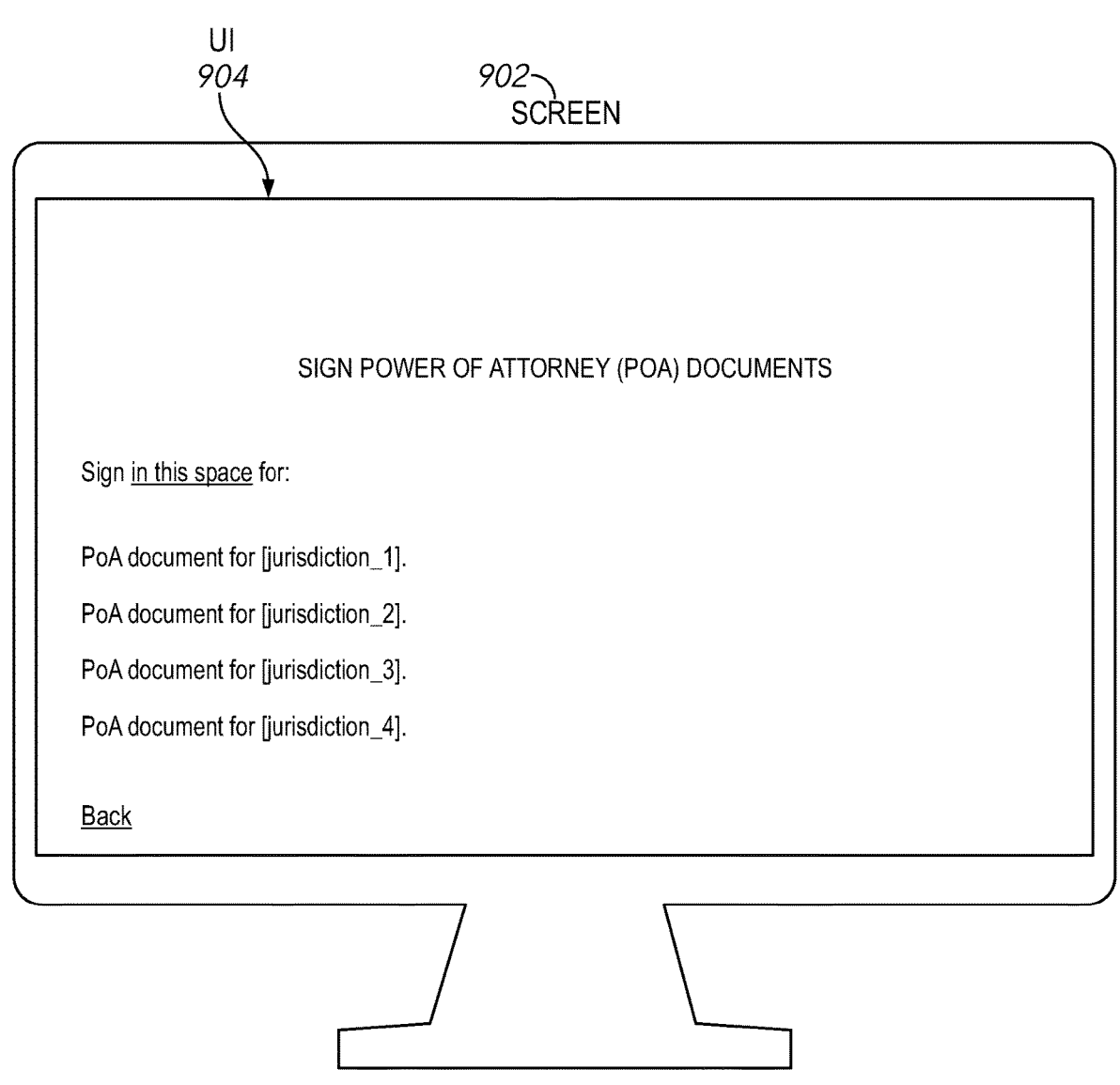
FIG. 9 is a sample view of a User Interface (UI) 904, shown on a screen 902 arranged in accordance with examples described herein.

FIG. 9 is a sample view of a User Interface (UI) 904, shown on a screen 902. The UI 904 shows an interface for executing multiple powers of attorney. For example, the screen 902 may be the screen 140 of FIG. 1, the screen 534 of FIG. 5 and/or a screen of a computing system used by user 452 of FIG. 4. The view shown in FIG. 9 may occur, for example, at block 616 of method 600 of FIG. 6.

In the example of FIG. 9, a user may be prompted to provide a signature that may be used to execute multiple power of attorney documents. In the example of FIG. 9, power of attorney documents for Jurisdiction_1, Jurisdiction_2, Jurisdiction_3, and Jurisdiction_4 are shown. A user may execute all power of attorney documents by entering a signature in the designated space and/or by selecting the link for the designated space shown in FIG. 9. In this manner, the user's computing system and/or the computing system of the OSP may apply the digital signature to the power of attorney documents in the region of those documents designated for signature.

The communication depicted in FIG. 9 may be sent to the computing system having the screen 702 using email, or by a connector, or an API or other communication mechanism.

Figure 10:
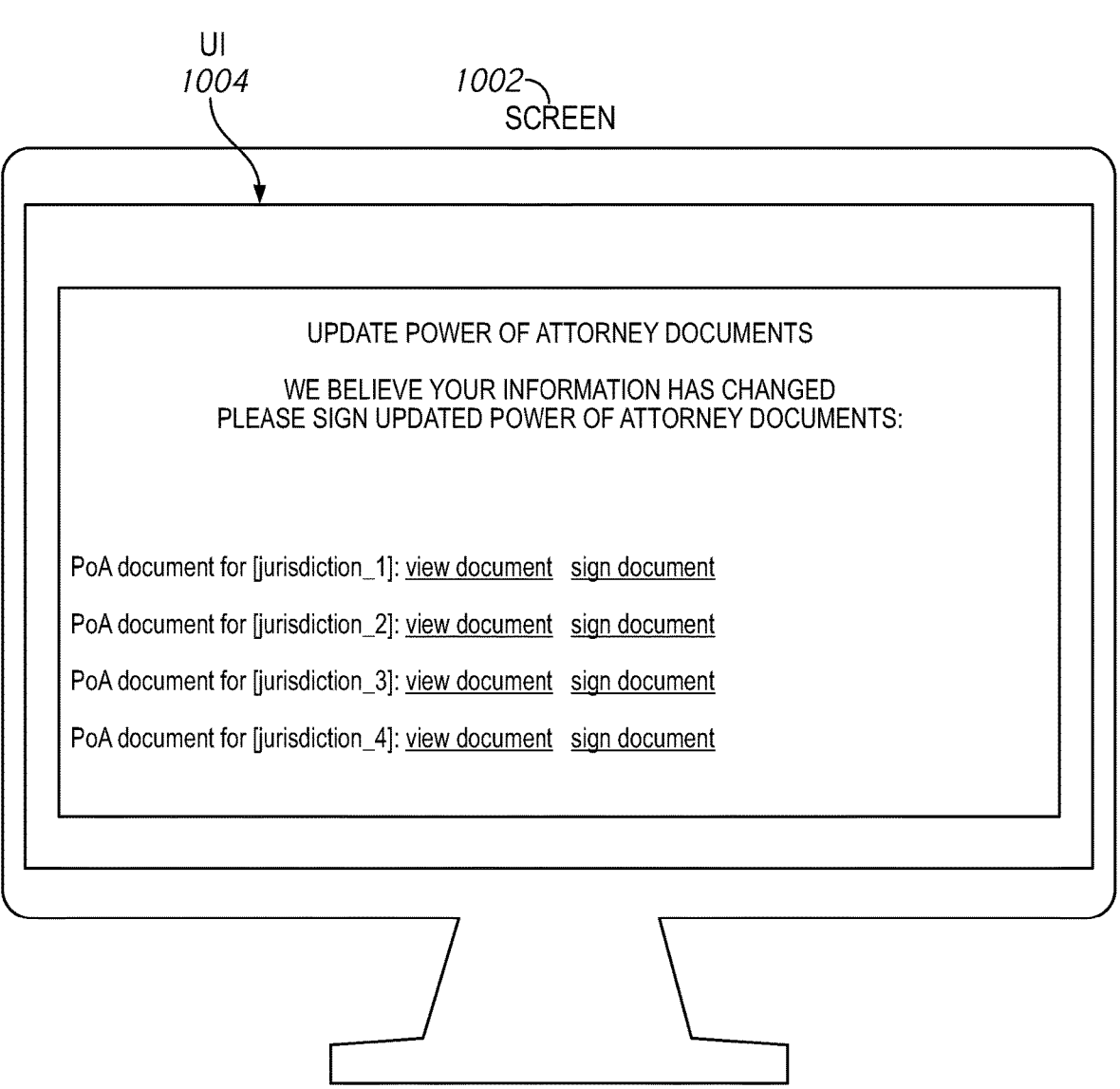
FIG. 10 is a sample view of a User Interface (UI) 1004, shown on a screen 1002 arranged in accordance with examples described herein.

FIG. 10 is a sample view of a User Interface (UI) 1004, shown on a screen 1002. The UI 1004 shows an example of a computing system prompting a user to execute updated power of attorney documents. For example, the screen 1002 may be the screen 140 of FIG. 1, the screen 534 of FIG. 5 and/or a screen of a computing system used by user 452 of FIG. 4. The view shown in FIG. 10 may occur, for example, at block 616 of method 600 of FIG. 6 and/or at block 314 of FIG. 3 and/or following block 318 of FIG. 3 at a time when a system determines the power of attorney should be updated.

In the example of FIG. 10, the user is provided a notification that the system believes their information has changed. For example, the server computer 206 may access attribute data database 228 and determine that information used in the power of attorney has changed (e.g., a name change, business change, and/or merger) and/or may access the authorization credential database 222 and determine that the power of attorney has expired. Accordingly, the user may be presented with updated documents for signature. IN the example of FIG. 10, the user is provided with updated documents for Jurisdiction_1, Jurisdiction_2, Jurisdiction_3, and Jurisdiction_4. The user has an option to view each document and/or sign each document by selecting the appropriate links in the user interface. A link is also provided in UI 1004 to sign all available power of attorney documents at once (e.g., in a serial manner). The links to view the document may bring the document up in a viewer, such as ADOBE ACROBAT, MICROSOFT WORD, or some other document viewing application. The links to sign the documents may, for example, launch a digital signature application and display the power of attorney documents for signature to the user, such as using DOCUSIGN, ADOBE SIGN, or other electronic signature application.

The updated executed power of attorney documents may be transmitted back to the OSP and/or computing system of the OSP for storage and/or submission to taxing authorities.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

Details have been included herein to provide a thorough understanding. In other instances, well-known aspects have not been described, in order to not obscure unnecessarily this description.

Some technologies or techniques described in this document may be known. Even then, however, it does not necessarily follow that it is known to apply such technologies or techniques as described in this document, or for the purposes described in this document.

This description includes one or more examples, but this fact does not limit how all examples may be practiced. Indeed, examples, instances, versions or embodiments of the technology may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

A number of embodiments are possible, each including various combinations of elements. When one or more of the appended drawings—which are part of this specification—are taken together, they may present some embodiments with their elements in a manner so compact that these embodiments can be surveyed quickly. This is true even if these elements are described individually extensively in this text, and these elements are only optional in other embodiments.

In general, the present disclosure reflects preferred embodiments. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claims.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, in their entirety and for any purpose, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and sub-combinations of elements, features and acts or operations, which are regarded as novel and non-obvious. The claims also include elements, features and acts or operations that are equivalent to what is explicitly mentioned. Additional claims for other such combinations and sub-combinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, 35 U.S.C. § 112(f) is invoked by the inventor(s) only when the words "means for" or "steps for" are expressly used in the claims. Accordingly, if these words are not used in a claim, then that claim is not intended to be construed by the inventor(s) in accordance with 35 U.S.C. § 112(f).

What is claimed is:

1. A method comprising:

receiving, at a computing system associated with an entity, a request from a user to engage a service offered by the computing system;

identifying, by the computing system, a domain implicated by the request from the user;

accessing, by the computing system, a first electronic repository, the first electronic repository storing rules regarding authorization credentials, including rules regarding authorization credentials for the domain, and wherein the rules regarding authorization credentials for the domain specify particular attributes for inclusion in the authorization credentials for the domain;

accessing, by the computing system, a second electronic repository, the second electronic repository storing values of attributes associated with the user, including the particular attributes;

generating, by the computing system, an authorization credential by combining the values of the particular attributes for the user in accordance with the rules regarding authorization credentials for the domain;

transmitting the authorization credential to the user for verification; and receiving, at the computing system, a verified authorization credential from the user.

2. The method of claim 1, further comprising identifying, by the computing system, multiple domains, including the domain, implicated by the request from the user;

accessing, by the computing system, the first electronic repository to access rules regarding authorization credentials for each of the multiple domains;

generating, by the computing system, at least one authorization credential for each of the multiple domains by combining the values of the particular attributes for the user in accordance with respective rules regarding authorization credentials for each of the multiple domains.

3. The method of claim 1, further comprising:

transmitting, by the computing system, the verified authorization credential to another computing system operated by a secondary entity, the secondary entity configured to utilize the rules regarding authorization credentials for the domain.

4. The method of claim 3, transmitting data on behalf of the user to the another computing system and causing the data to be accepted by the another computing system on behalf of the user due, at least in part, to the verified authorization credential.

5. The method of claim 4, further comprising generating the data at the computing system using the service offered by the computing system.

6. The method of claim 1, wherein said transmitting the authorization credential to the user for verification comprises causing another computing system accessed by the user to display the authorization credential on a display for verification.

7. The method of claim 6, wherein the another computing system comprises a mobile device.

8. The method of claim 1, wherein said receiving the verified authorization credential comprises receiving the authorization credential including an augmentation by the user.

9. The method of claim 1, wherein the domain comprises a government entity.

10. The method of claim 1, further comprising, prior to transmitting the authorization credential to the user for verification, automatically accessing additional data regarding the user accessible to the computing system; and correcting at least one discrepancy between the authorization credential and the additional data.

11. The method of claim 1, further comprising:

accessing the second repository and detecting a change in the particular attributes.

12. The method of claim 11, further comprising:

transmitting a notification to the user to update the authorization credential based on the change.

13. The method of claim 11, further comprising:

updating the authorization credential based on the change.

14. The method of claim 1, wherein transmitting the authorization credential to the user for verification comprises transmitting the authorization credential to a computing system of the user.

* * * * *